(12) United States Patent
Hihara et al.

(10) Patent No.: US 12,083,726 B2
(45) Date of Patent: Sep. 10, 2024

(54) ABNORMALITY DETECTION APPARATUS, ABNORMALITY DETECTION METHOD, AND NON-TRANSITORY COMPUTER READABLE RECORDING MEDIUM

(71) Applicant: The Japan Steel Works, Ltd., Tokyo (JP)

(72) Inventors: Keita Hihara, Tokyo (JP); Soma Mitani, Tokyo (JP); Masato Kawakita, Tokyo (JP)

(73) Assignee: The Japan Steel Works, Ltd., Tokyo (JP)

( * ) Notice: Subject to any disclaimer, the term of this patent is extended or adjusted under 35 U.S.C. 154(b) by 293 days.

(21) Appl. No.: 17/772,725

(22) PCT Filed: Oct. 30, 2020

(86) PCT No.: PCT/JP2020/040740
§ 371 (c)(1),
(2) Date: Apr. 28, 2022

(87) PCT Pub. No.: WO2021/090765
PCT Pub. Date: May 14, 2021

(65) Prior Publication Data
US 2022/0347905 A1    Nov. 3, 2022

(30) Foreign Application Priority Data

Nov. 6, 2019  (JP) ................. 2019-201762

(51) Int. Cl.
*B29C 45/76*     (2006.01)
*G01M 99/00*    (2011.01)
*G01P 15/00*    (2006.01)

(52) U.S. Cl.
CPC ............. *B29C 45/76* (2013.01); *G01M 99/00* (2013.01); *G01P 15/00* (2013.01);
(Continued)

(58) Field of Classification Search
CPC .......... B29C 45/76; B29C 2945/76163; B29C 2945/76187; B29C 2945/76451; G01M 99/00; G01P 15/00
See application file for complete search history.

(56) References Cited

U.S. PATENT DOCUMENTS 7,369,964 B2    5/2008  Nishizawa et al.
11,921,004 B2 *  3/2024  Matsumura ............ G01H 1/003
(Continued)

FOREIGN PATENT DOCUMENTS

DE    112017004539 T5    5/2019
JP    H5-50480 A    3/1993
(Continued)

OTHER PUBLICATIONS

Machine Translation of JP 2010038567 A (Year: 2010).*
(Continued)

*Primary Examiner* — Nguyen Q. Ha
(74) *Attorney, Agent, or Firm* — Bret E. Field; Bozicevic, Field & Francis LLP

(57) ABSTRACT

An abnormality detection apparatus for detecting an abnormality of a ball screw provided in an injection molding machine includes: a vibration sensor configured to detect vibration of the ball screw; and a computation unit configured to detect an abnormality of the ball screw based on information related to a distribution of frequency components obtained by frequency analysis of a vibration intensity detected by the vibration sensor, and information related to a distribution of frequency components obtained by frequency analysis of a vibration intensity detected when the ball screw, which is normal, operates.

12 Claims, 22 Drawing Sheets

(52) U.S. Cl.
CPC ............ *B29C 2945/76163* (2013.01); *B29C 2945/76187* (2013.01); *B29C 2945/76451* (2013.01)

(56) References Cited

U.S. PATENT DOCUMENTS

| | | |
|---|---|---|
| 2015/0354690 A1 | 12/2015 | Cheng et al. |
| 2016/0282223 A1 | 9/2016 | Yamazaki |
| 2018/0345556 A1 | 12/2018 | Nishimura et al. |
| 2019/0163164 A1* | 5/2019 | Hongo .................. G05B 19/19 |
| 2019/0346341 A1 | 11/2019 | Honjo et al. |

FOREIGN PATENT DOCUMENTS

| | | | | |
|---|---|---|---|---|
| JP | H0550480 A | * | 3/1993 | ............ B29C 45/76 |
| JP | H9-262889 A | | 10/1997 | |
| JP | 2010038567 A | * | 2/2010 | ......... F16H 25/2204 |
| JP | 2012-93983 A | | 5/2012 | |
| JP | 2013-164386 A | | 8/2013 | |
| JP | 2013-257014 A | | 12/2013 | |
| JP | 2013-257253 A | | 12/2013 | |
| JP | 2015-111113 A | | 6/2015 | |
| JP | 2017-194371 A | | 10/2017 | |
| JP | 2018-202706 A | | 12/2018 | |
| TW | 201337233 A | | 9/2013 | |
| TW | 201545832 A | | 12/2015 | |

OTHER PUBLICATIONS

Machine Translation of JP H0550480 A (Year: 1993).*
Office Action for Taiwanese Application No. 109138219 mailed on Oct. 24, 2023, with its English Translation, 15 pages.
Extended European Search Report for European Application No. 20884215.3 mailed Nov. 8, 2023, 21 pages.
Office Action for Chinese Application No. 202080076151.9 mailed Dec. 7, 2023, with its Machine Translation, 16 pages.
English Translation of International Search Report for PCT Application No. PCT/JP2020/040740 mailed Dec. 15, 2020, 2 pages.
Fan al., Signal and test technology, Beihang University Press, Apr. 2011, p. 241, with its English translation, 4 pages.
Second Office Action for Chinese Application No. 202080076151.9 mailed Jun. 1, 2024, with its English translation, 18 pages.

* cited by examiner

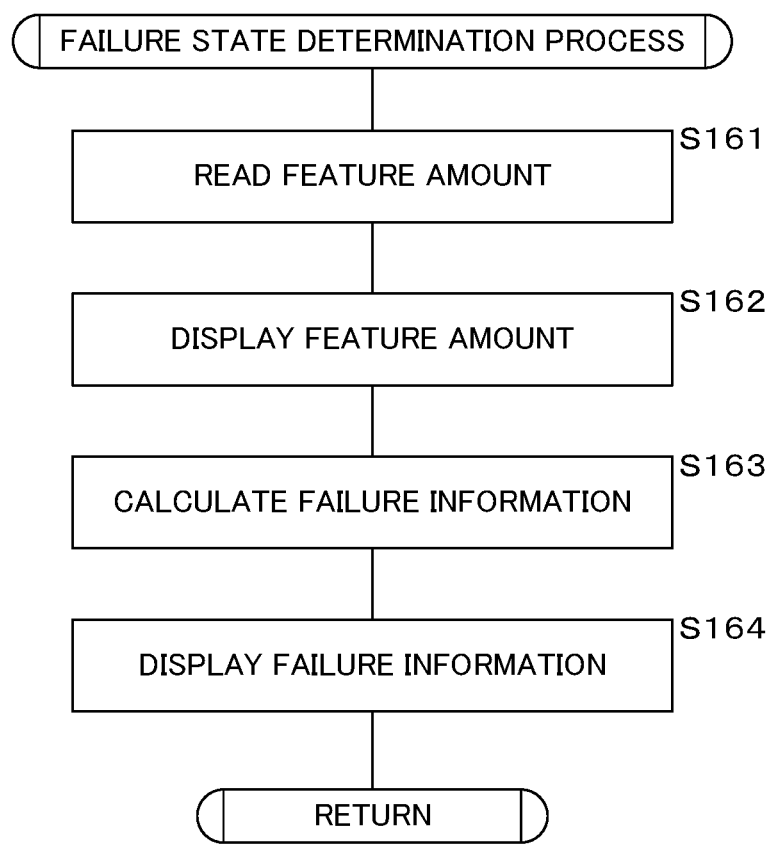

ABNORMALITY DETECTION APPARATUS, ABNORMALITY DETECTION METHOD, AND NON-TRANSITORY COMPUTER READABLE RECORDING MEDIUM

CROSS-REFERENCE TO RELATED APPLICATIONS

This application is the national phase under 35 U. S. C. § 371 of PCT International Application No. PCT/JP2020/040740 which has an International filing date of Oct. 30, 2020 and designated the United States of America.

FIELD

The present disclosure relates to an abnormality detection apparatus, an abnormality detection method, and a computer program for detecting an abnormality of a ball screw provided in an injection molding machine.

BACKGROUND

Japanese Patent Laid-Open Publication No. 5-50480 discloses a monitoring method in which vibration and operating noise of each movable portion of an injection molding machine are monitored by an acceleration sensor and a microphone, and a state of a molding process and an abnormality occurrence of the movable portion are detected.

Japanese Patent Laid-Open Publication No. 9-262889 discloses a load state display device that calculates an average load from an instantaneous current and instantaneous voltage of each motor of an injection molding machine, detects a load abnormality in a drive system, and issues an alarm.

However, a vibration waveform generated in the ball screw provided in the injection molding machine is complicated, and there is a problem that the abnormality of the ball screw cannot be detected accurately by simply monitoring a vibration intensity.

Japanese Patent Laid-Open Publication No. 5-50480 fails to disclose a specific method for analyzing acceleration data and a method for detecting an abnormality.

SUMMARY

An object of the present disclosure is to provide an abnormality detection apparatus, an abnormality detection method, and a computer program capable of detecting an abnormality of a ball screw by frequency analysis of a vibration intensity generated in the ball screw.

Means for Solving Problems

An abnormality detection apparatus of an aspect of the present disclosure is an abnormality detection apparatus for detecting an abnormality of a ball screw provided in an injection molding machine, the abnormality detection apparatus comprising: a vibration sensor configured to detect vibration of the ball screw; and a computation unit configured to detect an abnormality of the ball screw based on information related to a distribution of frequency components obtained by frequency analysis of a vibration intensity detected by the vibration sensor, and information related to a distribution of frequency components obtained by frequency analysis of a vibration intensity detected when the ball screw, which is normal, operates.

An abnormality detection method of an aspect of the present disclosure is an abnormality detection method of detecting an abnormality of an injection ball screw provided in an injection molding machine, the abnormality detection method comprising: detecting vibration of the ball screw; performing frequency analysis on a detected vibration intensity; and detecting an abnormality of the ball screw based on information related to a distribution of frequency components obtained by frequency analysis, and information related to a distribution of frequency components obtained by frequency analysis of a vibration intensity detected when the ball screw, which is normal, operates.

A computer program of an aspect of the present disclosure is a computer program for causing a computer to execute a process of detecting an abnormality of an injection ball screw provided in an injection molding machine, the computer program causing the computer to execute processes of detecting vibration of the ball screw; performing frequency analysis on a detected vibration intensity; and detecting an abnormality of the ball screw based on information related to a distribution of frequency components obtained by frequency analysis, and information related to a distribution of frequency components obtained by frequency analysis of a vibration intensity detected when the ball screw, which is normal, operates.

According to the present disclosure, it is possible to detect an abnormality of a ball screw by frequency analysis of a vibration intensity generated in the ball screw.

The above and further objects and features will more fully be apparent from the following detailed description with accompanying drawings.

BRIEF DESCRIPTION OF THE DRAWINGS

FIG. 13 is a flowchart illustrating a processing procedure related to a failure state determination process.

DETAILED DESCRIPTION

Specific examples of an abnormality detection apparatus, an abnormality detection method, and a computer program according to embodiments of the present disclosure will be described below with reference to the drawings. It should be noted that the invention is not limited to these examples, is indicated by the scope of claims, and is intended to include all modifications within the meaning and scope equivalent to the scope of claims.

Hereinafter, the disclosure will be specifically described with reference to the drawings illustrating the embodiments thereof.

First Embodiment

<Injection Molding Machine>

Figure 1:
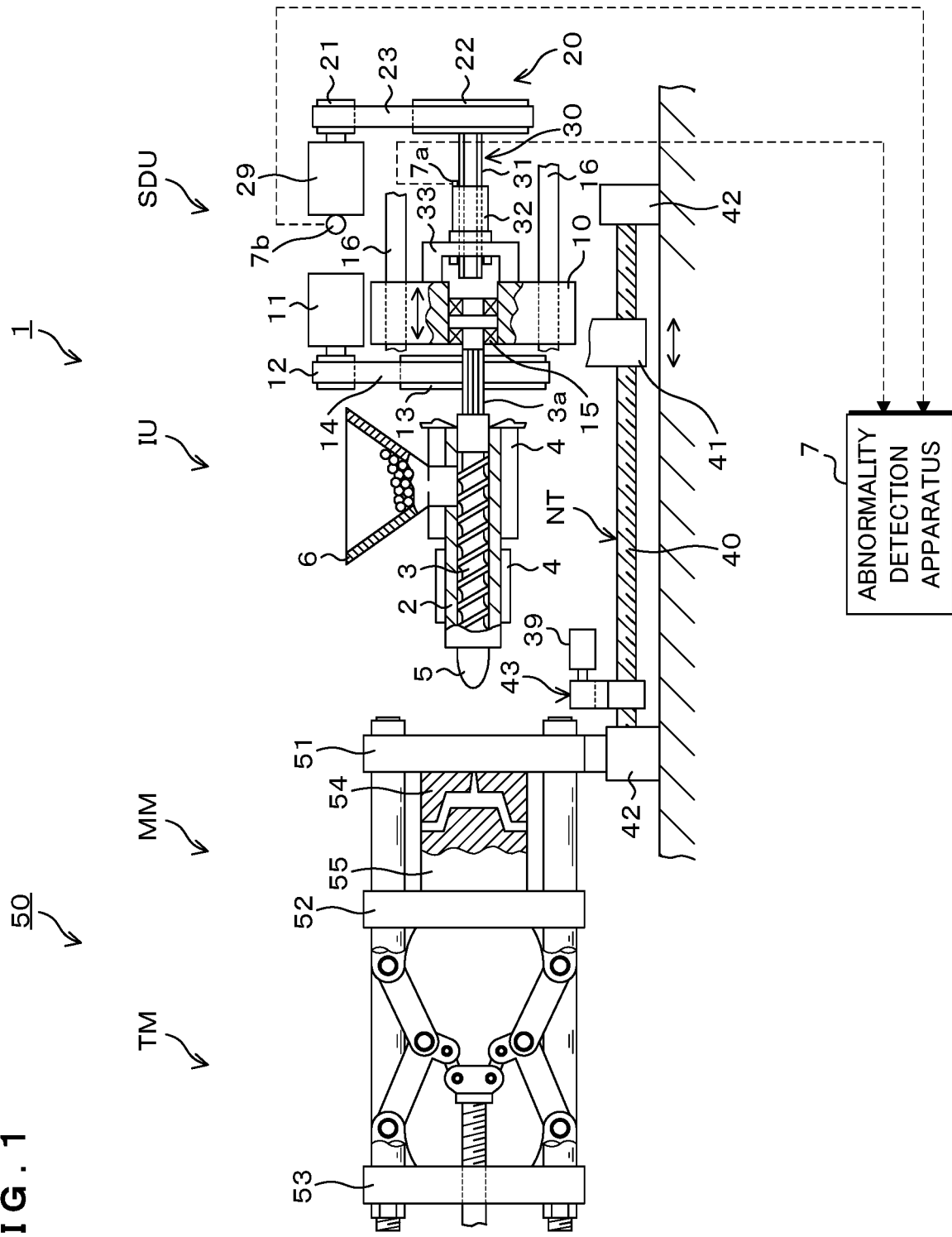
FIG. 1 is a partial cross-sectional front view illustrating a configuration example of an injection molding machine according to a first embodiment.

FIG. 1 is a partial cross-sectional front view illustrating a configuration example of an injection molding machine according to a first embodiment. The injection molding machine according to the first embodiment includes an injection apparatus 1, a mold clamping apparatus 50 disposed in front of the injection apparatus 1 (left side in FIG. 1), a control apparatus (not illustrated), and an abnormality detection apparatus 7 according to the first embodiment. Operations of the injection apparatus 1 and the mold clamping apparatus 50 are controlled by the control apparatus.

The injection apparatus 1 includes an injection unit IU, a screw drive unit SDU that drives a screw 3 of the injection unit IU, and a nozzle touch device NT.

The injection unit IU includes a heating cylinder 2 and a screw 3 provided inside the heating cylinder 2 so that the screw 3 may be driven in a plasticization direction and an injection direction. A plurality of heating heaters 4, 4, . . . for controlling a heat generation temperature is provided on an outer peripheral portion of the heating cylinder 2. An injection nozzle 5 is provided at a front tip of the heating cylinder 2. A hopper 6 for temporarily storing a resin material is provided near the rear of the heating cylinder 2. A spline shaft 3a extending in a shaft line direction and backward from a rear end of the screw 3 projects outward from a rear end of the heating cylinder 2 and is connected to the screw drive unit SDU.

The screw drive unit SDU includes an intermediate plate 10 for moving the screw 3 in an axial direction, a plasticization electric motor 11, and an injection electric motor 29.

The intermediate plate 10 is supported so as to be guided in the axial direction of the screw 3 in a state where rotation is restricted by a plurality of guide rods 16 and 16 directed in the axial direction of the screw 3. A bearing seat for bearing a rear end of the spline shaft 3a is formed in a substantially central portion of the intermediate plate 10, and a thrust bearing 15 is attached to the bearing seat. The rear end of the spline shaft 3a is rotatably supported by the intermediate plate 10 by the thrust bearing 15 that receives loads in a radial direction and a thrust direction. When the intermediate plate 10 moves in a front-rear direction (horizontal direction in FIG. 1), that is, in the axial direction of the screw 3, the screw 3 is driven in the axial direction.

The intermediate plate 10 is coupled to an injection ball screw 30 for injection. The injection ball screw 30 is a mechanism for driving the screw 3 in the axial direction. The injection ball screw 30 includes an injection screw shaft 31 and a nut 32. The nut 32 that moves linearly along the screw shaft 31 is screwed onto the injection screw shaft 31. The nut 32 is attached to the intermediate plate 10 via a nut fixing member 33.

The injection molding machine includes an injection transmission mechanism 20 for transmitting a driving force of the injection electric motor 29 to the ball screw 30. The injection transmission mechanism 20 includes an injection drive pulley 21 provided on an output shaft of the injection electric motor 29, an injection driven pulley 22 provided at an end of the injection screw shaft 31, and an injection timing belt 23 hung around the injection drive pulley 21 and the injection driven pulley 22. Each of the injection drive pulley 21, the injection driven pulley 22, and the injection timing belt 23 has a plurality of teeth for transmitting the driving force of the injection electric motor 29 by meshing with each other.

When the injection electric motor 29 outputs a driving force, the driving force is transmitted to the ball screw 30 via the injection drive pulley 21 and the injection driven pulley 22. The screw shaft 31 of the ball screw 30 is rotated by the driving force. Since rotation of the intermediate plate 10 is restricted by the guide rods 16 and 16, rotation of the nut 32 is also restricted. Therefore, when the screw shaft 31 is rotationally driven, the nut 32, in other words, the intermediate plate 10 and the screw 3 move in the axial direction.

Meanwhile, a plasticization drive pulley 12 is provided on an output shaft of the plasticization electric motor 11. On the spline shaft 3a, a plasticization driven pulley 13 is constrained in a rotational direction and is provided so as to be movable in the axial direction. A plasticization timing belt 14 is hung around the plasticization drive pulley 12 and the plasticization driven pulley 13. When the plasticization electric motor 11 outputs a driving force, the screw 3 is rotationally driven around the shaft.

The nozzle touch device NT is provided to drive the injection nozzle 5 of the injection apparatus 1 configured as described above in directions of touching and away from a locating ring of a fixed mold 54, which will be described later. The nozzle touch device NT includes a pair of support members 42 and 42 fixedly provided on an injection bed at a predetermined interval, a nozzle touch screw shaft 40 supported by bearings that receive loads in the thrust and radial directions on the support members 42 and 42, a nozzle touch nut 41 screwed to the nozzle touch screw shaft 40, and a nozzle touch electric motor 39 that drives the nozzle touch screw shaft 40 in forward and reverse directions. The nozzle touch nut 41 is fixed to a frame of the injection apparatus 1 (not illustrated). Since the pair of support members 42 and 42 is fixed to the injection bed, when the nozzle touch electric motor 39 rotates in the forward and reverse directions, the nozzle touch screw shaft 40 is rotationally driven in the forward and reverse directions via the nozzle touch transmission mechanism 43, and the nozzle touch nut 41 and the injection apparatus 1 are driven in directions in which the injection nozzle 5 touches and is away from the fixed mold 54.

The mold clamping apparatus 50 includes a mold device MM to which the mold is detachably attached and a toggle mechanism TM for tightening the mold. The mold device MM includes a stationary platen 51 to which the fixed mold 54 is detachably attached, and a movable platen 52 to which a movable mold 55 is similarly detachably attached. The toggle mechanism TM is provided between the movable platen 52 and a mold clamping housing 53. The toggle mechanism TM may open and close the fixed mold 54 and the movable mold 55 by moving the movable platen 52 in the front-rear direction (horizontal direction in FIG. 1) using a drive mechanism (not illustrated), and may tighten the mold so that the fixed mold 54 and the movable mold 55 do not open when the mold is filled with a molten resin injected from the injection apparatus 1.

<Abnormality Detection Apparatus 7>

Figure 2:
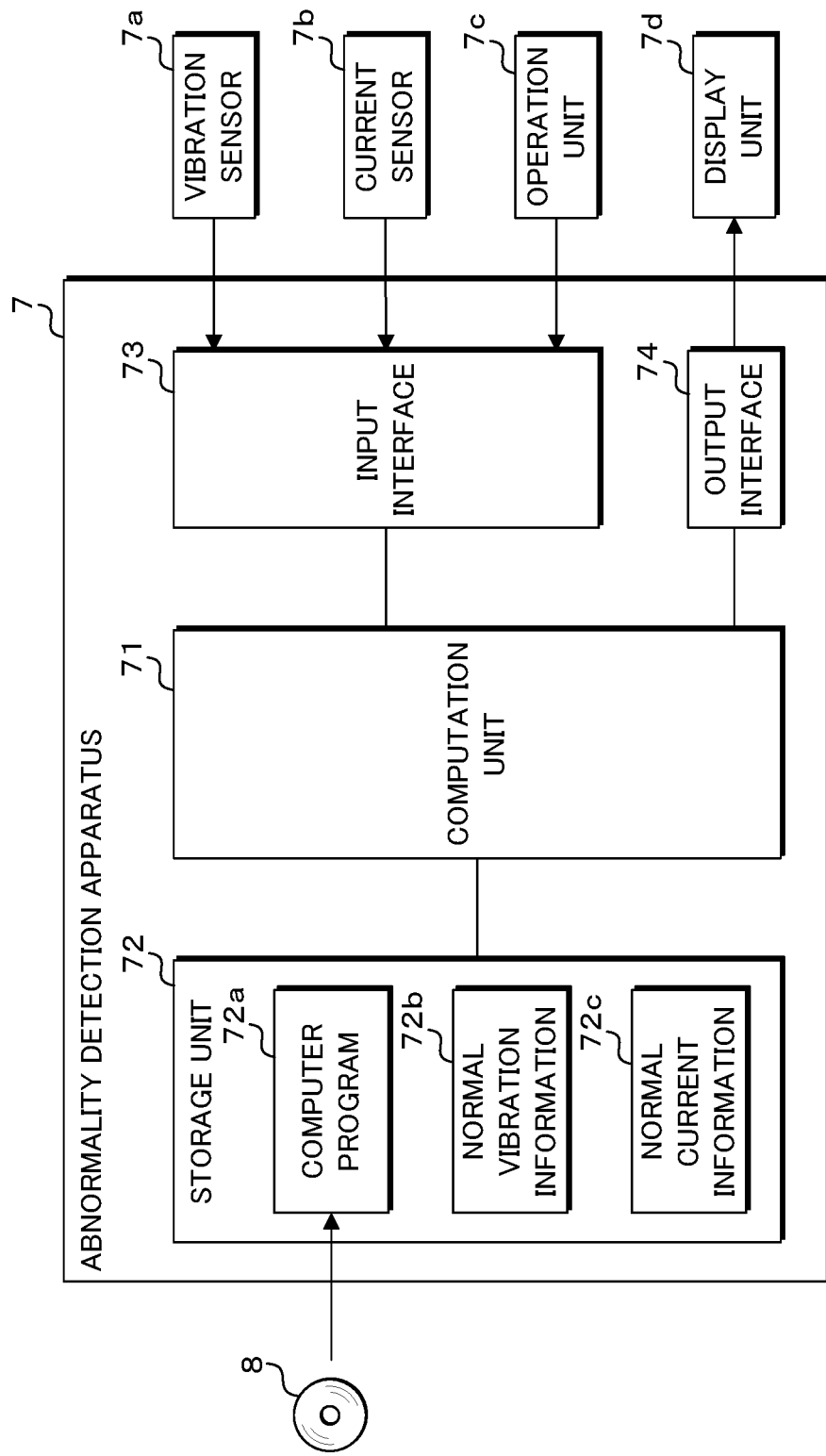
FIG. 2 is a block diagram illustrating a configuration example of the abnormality detection apparatus according to the first embodiment.

FIG. 2 is a block diagram illustrating a configuration example of the abnormality detection apparatus 7 according to the first embodiment.

The abnormality detection apparatus 7 is a computer, and includes a computation unit 71, a storage unit 72, an input interface (input I/F) 73, and an output interface (output I/F) 74. The computation unit 71 includes an arithmetic circuit such as a CPU (Central Processing Unit), a multi-core CPU, a GPU (Graphics Processing Unit), a GPGPU (General-purpose computing on graphics processing units), a TPU (Tensor Processing Unit), an ASIC (Application Specific Integrated Circuit), an FPGA (Field-Programmable Gate Array), or an NPU (Neural Processing Unit), an internal storage device such as a ROM (Read Only Memory) or a RAM (Random Access Memory), an I/O terminal, etc. The computation unit 71 functions as the abnormality detection apparatus 7 according to the first embodiment by executing a computer program 72a stored in a storage unit 72 described later. Note that each functional unit of the abnormality detection apparatus 7 may be realized by software, or some or all functional units thereof may be realized by hardware.

The storage unit 72, the input interface 73, and the output interface 74 are connected to the computation unit 71.

The storage unit 72 is a nonvolatile memory such as a hard disk, an EEPROM (Electrically Erasable Programmable ROM), or a flash memory. The storage unit 72 stores the computer program 72a for causing the computer to execute an abnormality detection method according to the first embodiment, normal vibration information 72b, and normal current information 72c. Details of the normal vibration information 72b and the normal current information 72c will be described later.

The computer program 72a according to the first embodiment may be recorded on a recording medium 8 so as to be readable by the computer. The storage unit 72 stores the computer program 72a read from the recording medium 8 by a reading device (not illustrated). The recording medium 8 is a semiconductor memory such as a flash memory. Further, the recording medium 8 may be an optical disc such as a CD (Compact Disc)-ROM, a DVD (Digital Versatile Disc)-ROM, or a BD (Blu-ray (registered trademark) Disc). Further, the recording medium 8 may be a flexible disk, a magnetic disk such as a hard disk, a magnetic optical disk, etc. Furthermore, the computer program 72a according to the first embodiment may be downloaded from an external server (not illustrated) connected to a communication network (not illustrated) and stored in the storage unit 72.

A vibration sensor 7a, a current sensor 7b, and an operation unit 7c are connected to the input interface 73.

The vibration sensor 7a is a sensor that measures vibration generated in the injection ball screw 30 and outputs vibration intensity data obtained by measurement to the computation unit 71 of the abnormality detection apparatus 7 by wire or wirelessly. As the vibration sensor 7a, for example, it is possible to use an acceleration sensor, a speed sensor, or a displacement sensor. Hereinafter, description will be given on the assumption that the vibration sensor 7a is the acceleration sensor. The vibration sensor 7a as the acceleration sensor outputs acceleration data indicating the vibration intensity to the computation unit 71. The computation unit 71 receives the acceleration data via the input interface 73, and stores the received acceleration data in the storage unit 72 as a vibration measurement data file.

The vibration sensor 7a is preferably configured to be attached to the nut 32. As for vibration caused by the abnormality of the ball screw 30, it is possible to more effectively measure the vibration caused by the abnormality of the ball screw 30 by providing the vibration sensor 7a on the nut 32 rather than the screw shaft 31.

The vibration sensor 7a may be attached to a side surface of the nut 32 having a cylindrical shape in a posture in which the acceleration of the screw shaft 31 in the axial direction (linear movement direction) is measured. A ball (not illustrated) is cyclically rolled between the screw shaft 31 and the nut 32, and a direction of force acting between a groove of the screw shaft 31, the ball, and the nut 32 is generally the shaft line direction of the screw shaft 31. Therefore, vibration caused by the abnormality of the ball screw 30 is greatly generated. For this reason, by attaching the vibration sensor 7a in the posture and at the position, the acceleration in the axial direction may be measured. Further, it is easier to install when compared to a peripheral surface of the nut 32.

It is preferable that an upper limit of a response frequency of the vibration sensor 7a, that is, a frequency at which vibration may be measured is about 2.5 kHz or more. As will be described later, it is possible to analyze a frequency component having at least the acceleration of 0 to 1000 Hz by frequency analysis of data obtained by measuring the acceleration at 2.5 kHz.

Depending on the characteristics of the injection apparatus 1, the abnormality of the ball screw 30 may be detected by analyzing a frequency component of about 50 to 600 Hz. In this case, it is sufficient to use the vibration sensor 7a having a measurable frequency upper limit of about 1.5 kHz or more.

The above-mentioned normal vibration information 72b stored in the storage unit 72 is information related to a distribution of frequency components (see FIGS. 8A and 8B) obtained by frequency analysis of the acceleration of vibration detected by the vibration sensor 7a when a normal ball screw 30 operates. Hereinafter, a waveform of the distribution of the frequency component obtained by the frequency analysis is appropriately referred to as a frequency analysis waveform. The information is, for example, information indicating the center of gravity of the frequency analysis waveform in a frequency-acceleration plane, which is calculated based on a plurality of pieces of data (frequency and acceleration) obtained from the normal ball screw 30 (see FIGS. 12A and 12B).

The current sensor 7*b* is a sensor that measures a driving AC current flowing through the injection electric motor 29 and outputs measured current data to the computation unit 71 of the abnormality detection apparatus 7 by wire or wirelessly. The computation unit 71 receives current data via the input interface 73, and stores received current data in the storage unit 72 as a current measurement data file.

The above-mentioned normal current information 72*c* stored in the storage unit 72 is information related to a distribution of frequency components obtained by frequency analysis of an alternating current detected by the current sensor 7*b* when the normal ball screw 30 operates. Hereinafter, a waveform of the distribution of the frequency components obtained by the frequency analysis is referred to as a frequency analysis waveform. Further, as will be described later, a waveform obtained by normalizing the frequency analysis waveform is referred to as a normalization waveform (see FIG. 19).

The information is, for example, a statistic indicating the characteristics of the normalization waveform calculated based on AC current data (frequency and current) obtained from the normal ball screw 30. The statistic is, for example, information related to a variance. The statistic is an example, and any information indicating the characteristics of the normalization waveform is sufficient. For example, it is possible to adopt image data indicating an average waveform of the normalization waveform. Further, since the abnormality detection apparatus 7 according to the first embodiment is configured to use the statistic of the normalized waveform, a statistic of a normalization waveform obtained from a model different from that of the injection molding machine to be inspected may be used as the normal current information 72*c*.

When the abnormality detection apparatus 7 is attached to the injection molding machine to inspect the abnormality of the ball screw 30 during maintenance and inspection of the injection molding machine, it is desirable that the vibration sensor 7*a* is detachably fixed to the ball screw 30 and the current sensor 7*b* is detachably provided on a conductive wire (not illustrated). The detachable current sensor 7*b* is, for example, a clamp type sensor.

In the case of a configuration in which the abnormality of the ball screw 30 of the injection molding machine is constantly monitored, the vibration sensor 7*a* and the current sensor 7*b* may be non-removably fixed to the ball screw 30 and any part of a drive circuit system of the injection electric motor 29, respectively.

In the following, a description will be given mainly of an example in which the vibration sensor 7*a* and the current sensor 7*b* are detachably configured and the abnormality of the ball screw 30 is inspected during maintenance and inspection.

The operation unit 7*c* is an interface for operating the operation of the abnormality detection apparatus 7 and inputting characteristic information indicating the characteristics of the injection transmission mechanism 20 as information for detecting the abnormality of the ball screw 30. The operation unit 7*c* is an operation panel having, for example, a button, a touch panel, etc. The operation unit 7*c* outputs the input characteristic information to the input interface 73.

When the output shaft of the injection electric motor 29 is directly coupled to the spline shaft 3*a* without the injection transmission mechanism 20 interposed therebetween, characteristic information indicating the characteristics of the injection electric motor 29 may be input to the operation unit 7*c*.

A display unit 7*d* is connected to the output interface 74. The display unit 7*d* displays acceleration data and current data measured using the vibration sensor 7*a* and the current sensor 7*b*, a frequency analysis result described later, a failure state determination result, etc.

<Abnormality Detection Based on Vibration>

Figure 3:
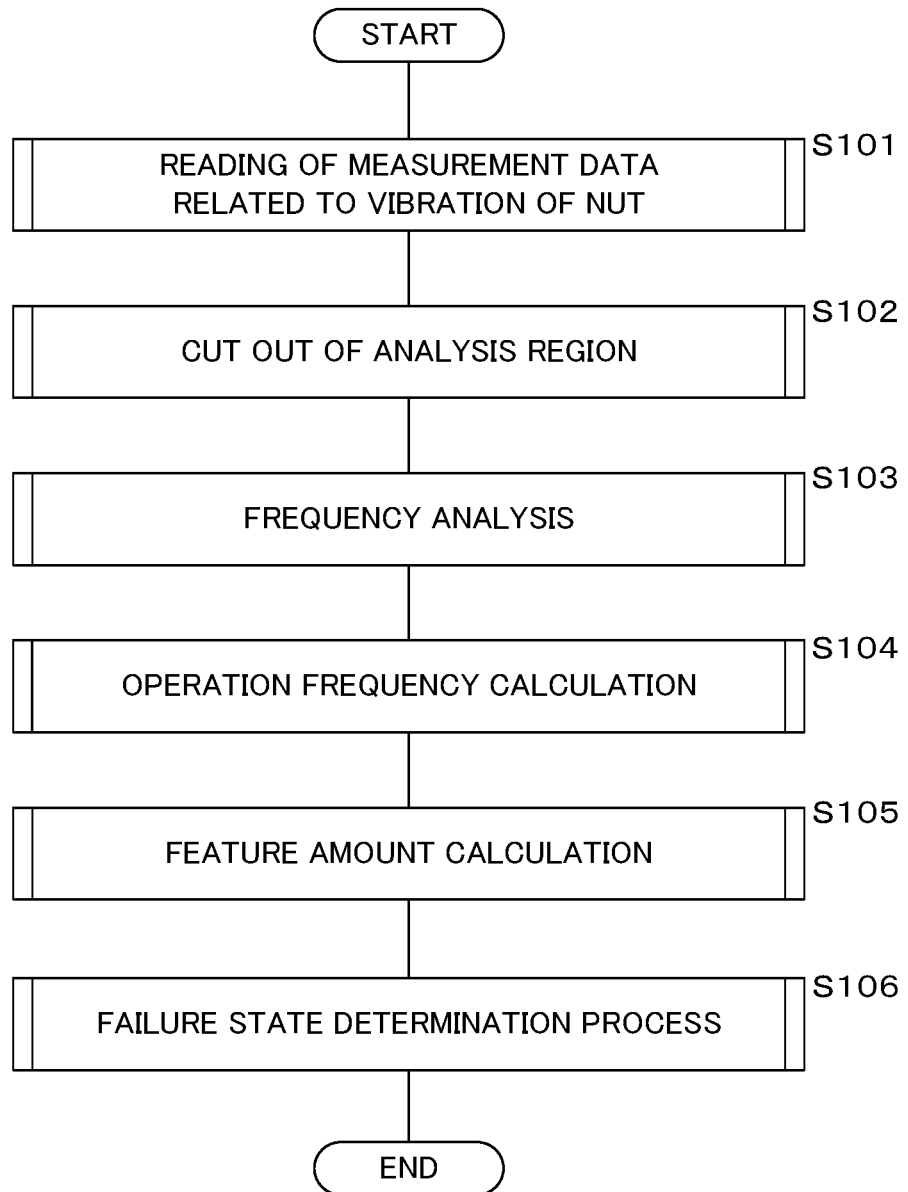
FIG. 3 is a flowchart illustrating a processing procedure of an abnormality detection method based on vibration.

FIG. 3 is a flowchart illustrating a processing procedure of an abnormality detection method based on vibration. In the following, a description will be given mainly of an example in which an operator performing maintenance and inspection of the injection molding machine activates the computer program 72*a* according to the first embodiment and inspects the presence or absence of an abnormality of the injection ball screw 30. Even though an input operation by the operator intervenes in some processes, the computation unit 71 may be configured to determine and execute all the processes.

First, the abnormality detection apparatus 7 reads measurement data related to the vibration of the injection nut 32 (step S101).

Figure 4:
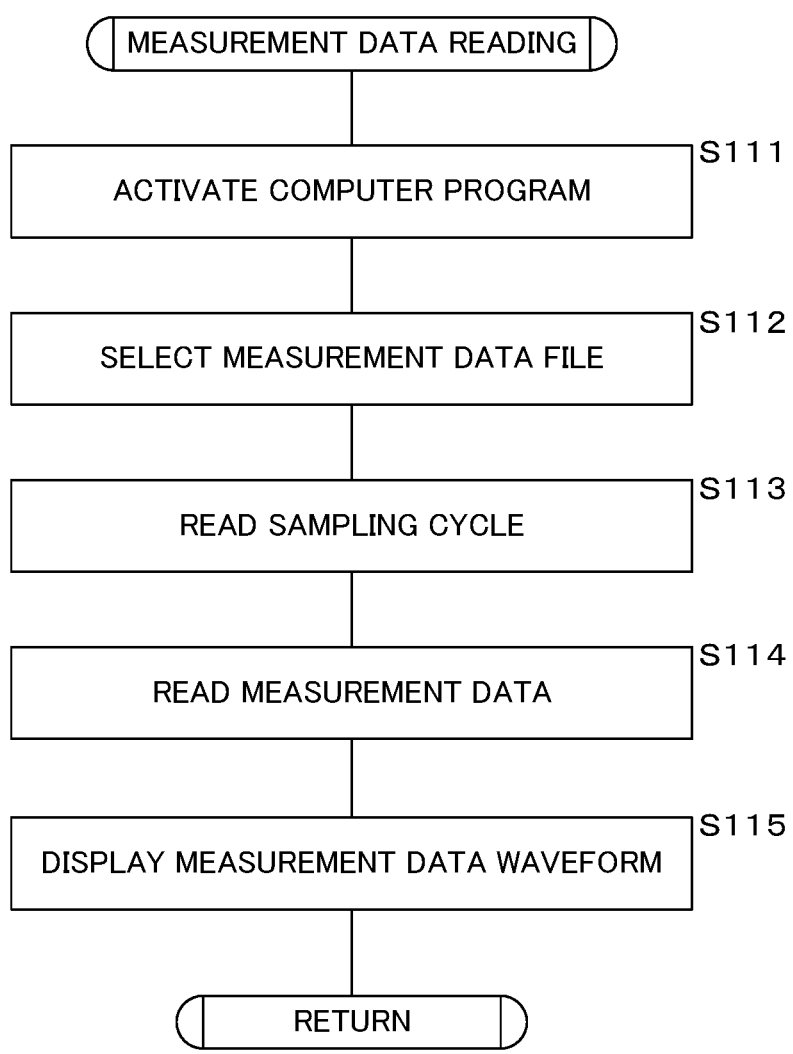
FIG. 4 is a flowchart illustrating a processing procedure related to reading measurement data.

FIG. 4 is a flowchart illustrating a processing procedure related to reading measurement data. The operator activates the computer program 72*a* according to the first embodiment (step S111).

The computer program 72*a* may be configured to be spontaneously activated by the computation unit 71 triggered by a predetermined condition.

Next, the operator selects a measurement data file in which acceleration data is accumulated (step S112), and the computation unit 71 reads a sampling cycle (step S113). Further, the computation unit 71 reads measurement data, that is, acceleration data from the selected measurement data file (step S114).

A file name of the measurement data file in which the acceleration data is recorded and the sampling cycle may be stored in advance in the storage unit 72 of the abnormality detection apparatus 7, and the computation unit 71 may automatically read the acceleration data according to the file name and sampling cycle stored by the storage unit 72.

Next, the computation unit 71 causes the display unit 7*d* to display the measured acceleration waveform (see FIG. 6) based on the read measurement data (step S115). Note that the acceleration waveform display is not essential. In particular, when the analysis region described later is automatically cut out, it is not necessary to display the acceleration waveform.

Returning to FIG. 3, the abnormality detection apparatus 7 completing the process of step S101 cuts out the analysis region (step S102).

Figure 5:
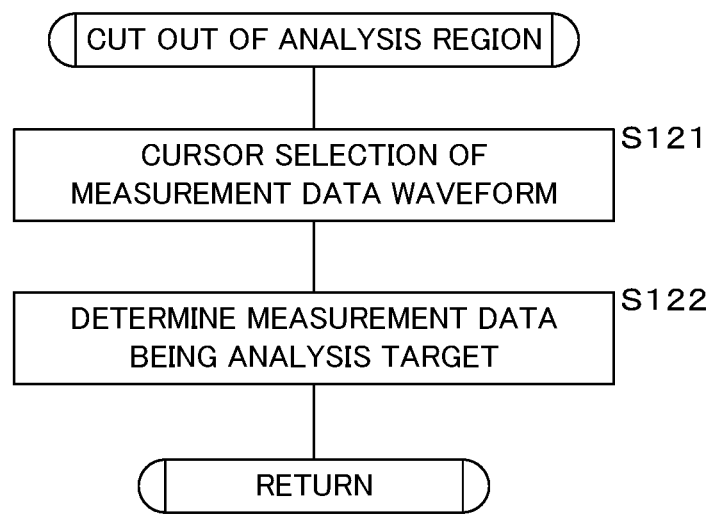
FIG. 5 is a flowchart illustrating a processing procedure related to cutting out an analysis region.
Figure 6:
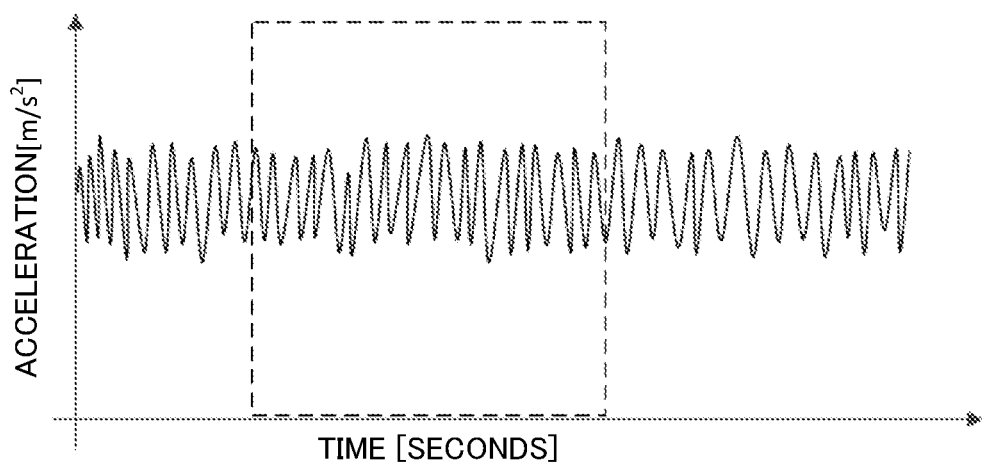
FIG. 6 is an explanatory diagram illustrating a process of cutting out an analysis region.

FIG. 5 is a flowchart illustrating a processing procedure related to cutting out the analysis region, and FIG. 6 is an explanatory diagram illustrating a process of cutting out the analysis region. The operator selects a region, which is an analysis target, using a cursor from the displayed acceleration waveform (step S121). The computation unit 71 receives a selection operation by the operator via the operation unit 7*c*, and causes the display unit 7*d* to display the received selection region as illustrated in FIG. 6. In FIG. 6, a horizontal axis indicates time, a vertical axis indicates acceleration, and a temporal change of acceleration is displayed as a waveform. In addition, a region for selecting an analysis target is displayed as a broken line rectangular frame.

Next, the operator determines measurement data which is an analysis target (step S122). The computation unit 71 receives a confirmation operation by the operator, and temporarily stores measurement data corresponding to the region selected in step S121, that is, acceleration data as an analysis target.

The computation unit 71 may be configured to automatically execute a process of acquiring measurement data in analysis region over a predetermined time as an analysis target.

Returning to FIG. 3, the abnormality detection apparatus 7 completing the process of step S102 performs frequency analysis on the measurement data which is an analysis target (step S103).

Figure 7:
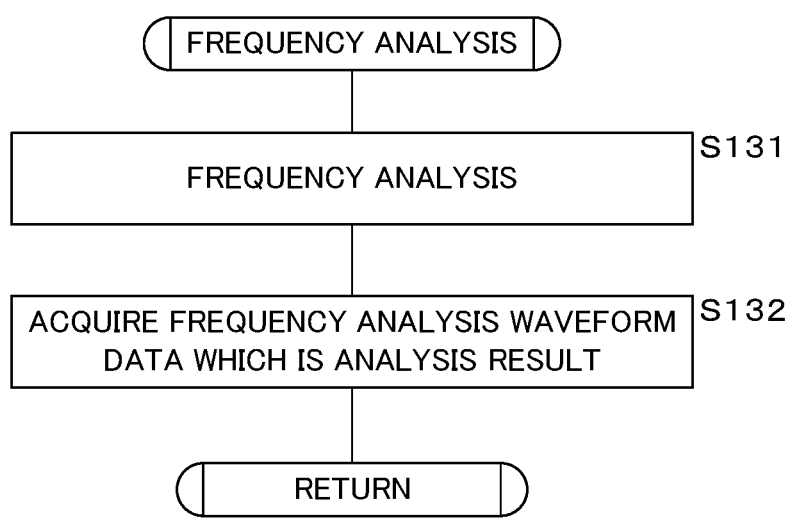
FIG. 7 is a flowchart illustrating a processing procedure related to frequency analysis.
Figure 8A:
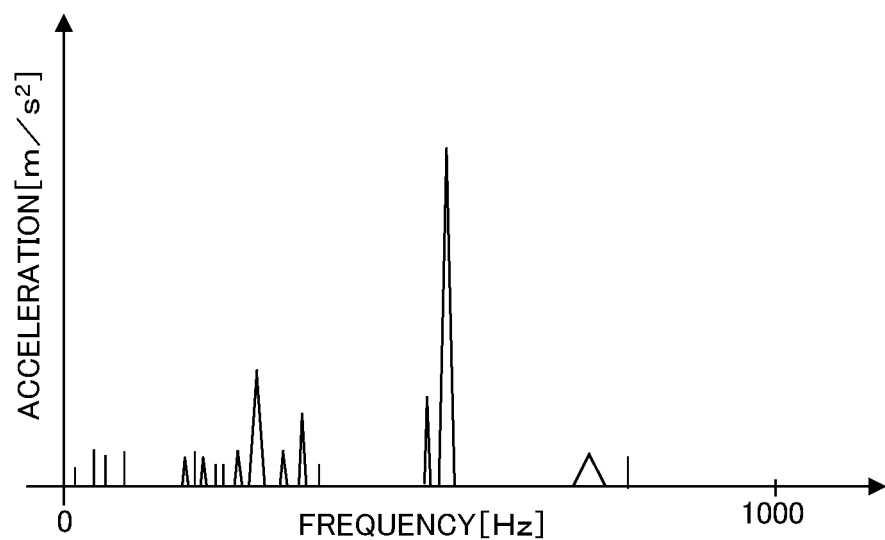
FIG. 8A is an explanatory diagram illustrating an example of a frequency analysis waveform.
Figure 8B:
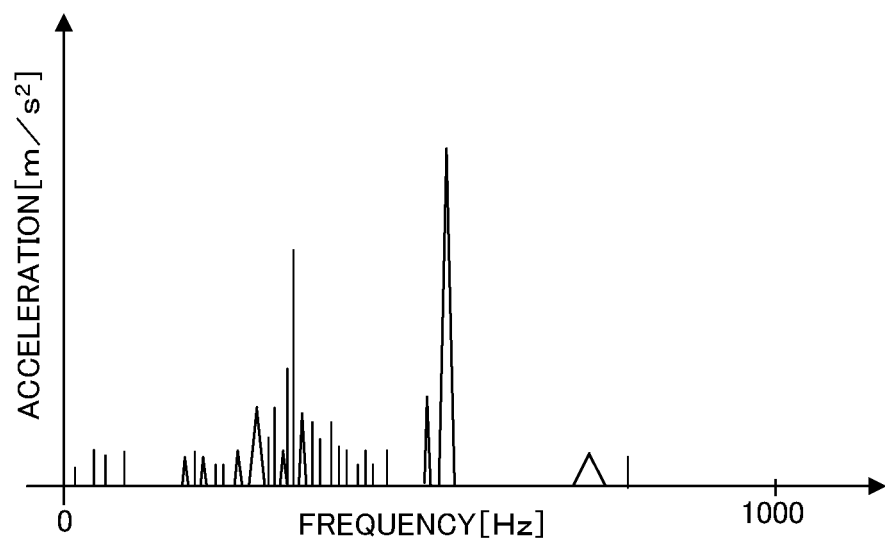
FIG. 8B is an explanatory diagram illustrating an example of a frequency analysis waveform.

FIG. 7 is a flowchart illustrating a processing procedure related to frequency analysis, and FIGS. 8A and 8B are explanatory diagrams illustrating examples of a frequency analysis waveform. The computation unit 71 executes a frequency analysis process on measurement data which is an analysis target, that is, acceleration data (step S131), and acquires frequency analysis waveform data which is an analysis result (step S132). Specifically, the computation unit 71 executes a fast Fourier transform (FFT). FFT is a known algorithm that performs a discrete Fourier transform at high speed. Frequency analysis converts acceleration, which is a function of time, into acceleration, which is a function of frequency.

FIG. 8A is an example of a frequency analysis waveform (frequency distribution) of acceleration obtained from acceleration data related to the normal ball screw 30, and FIG. 8B is an example of a frequency analysis waveform (frequency distribution) of acceleration obtained from acceleration data related to an abnormal ball screw 30. In FIGS. 8A and 8B, a horizontal axis indicates frequency and a vertical axis indicates acceleration. As may be seen by comparing FIGS. 8A and 8B, the frequency distribution of the acceleration is changing.

Returning to FIG. 3, the abnormality detection apparatus 7 completing the process of step S103 calculates an operation frequency related to driving of the injection ball screw 30 (step S104).

Figure 9:
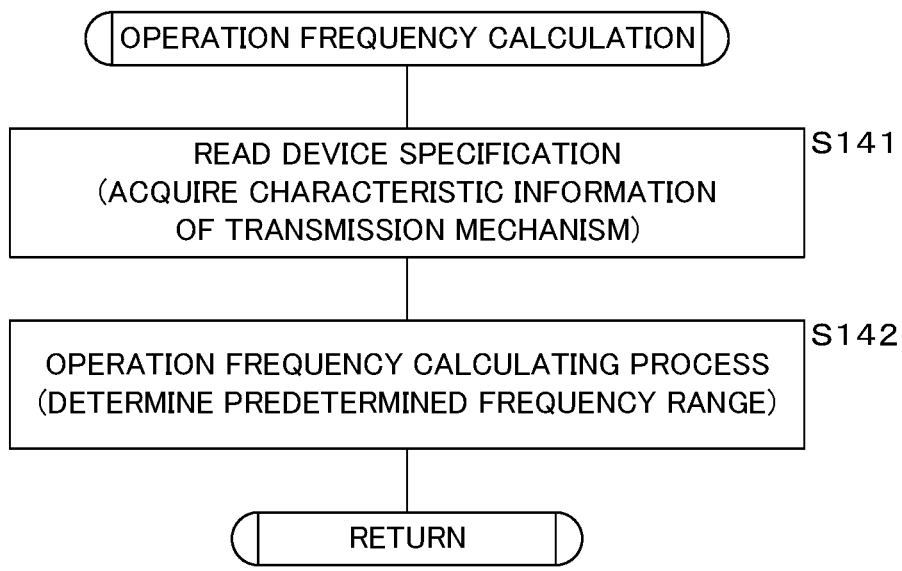
FIG. 9 is a flowchart illustrating a processing procedure related to operation frequency calculation.

FIG. 9 is a flowchart illustrating a processing procedure related to operation frequency calculation. The computation unit 71 reads the device specifications via the operation unit 7c (step S141). For example, the computation unit 71 acquires characteristic information of the injection transmission mechanism 20. The characteristic information of the injection transmission mechanism 20 includes, for example, information such as the number of teeth and the rotation speed [times/second] of the injection driven pulley 22.

When the injection electric motor 29 is directly coupled to the spline shaft 3a, the computation unit 71 acquires characteristic information of the injection electric motor 29. The characteristic information of the injection electric motor 29 is a numerical value related to a frequency of vibration generated when the injection electric motor 29 operates.

Next, the computation unit 71 executes a process of calculating the operation frequency based on the acquired characteristic information (step S142). The operation frequency is a main frequency of vibration generated in the nut 32 via the screw shaft 31 due to the operation of the drive system. For example, the computation unit 71 may calculate the operation frequency by multiplying the number of teeth of the injection driven pulley 22 by the rotation speed.

The computation unit 71 executing the process of step S142 functions as a functional unit that determines a predetermined frequency range based on the information acquired by the acquisition unit, that is, the characteristic information. The predetermined frequency range is, for example, a frequency range determined with reference to the operation frequency.

Further, the computation unit 71 may be configured to acquire characteristic information of the injection transmission mechanism 20 or the injection electric motor 29 in advance, store the characteristic information in the storage unit 72, and automatically execute calculation of the operation frequency.

Returning to FIG. 3, the abnormality detection apparatus 7 completing the process of step S104 calculates the feature amount (step S105).

Figure 10:
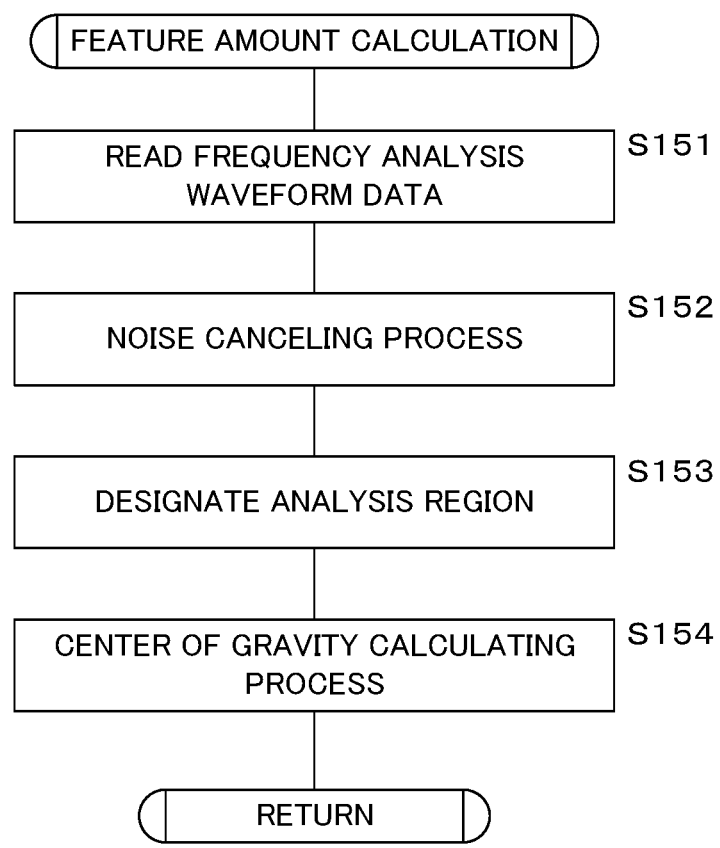
FIG. 10 is a flowchart illustrating a processing procedure related to feature amount calculation.
Figure 11A:
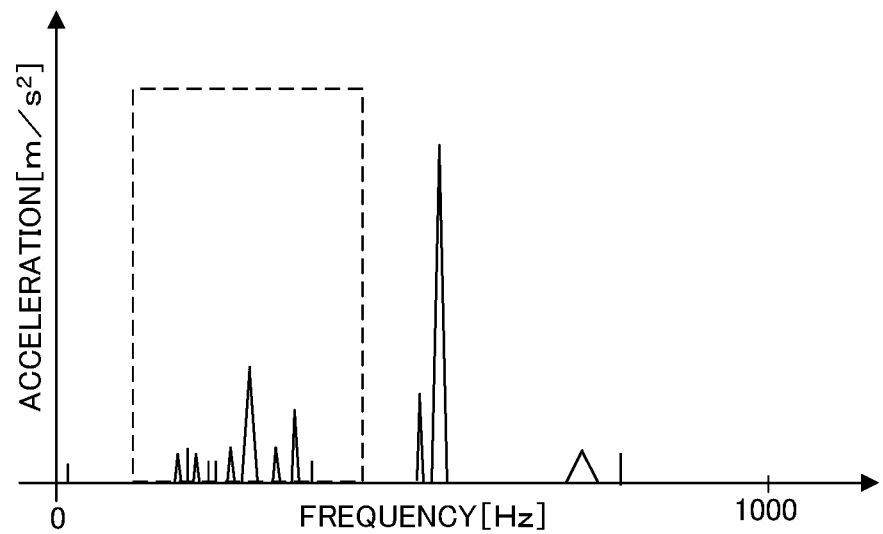
FIG. 11A is explanatory diagram illustrating a process of designating an analysis region.
Figure 11B:
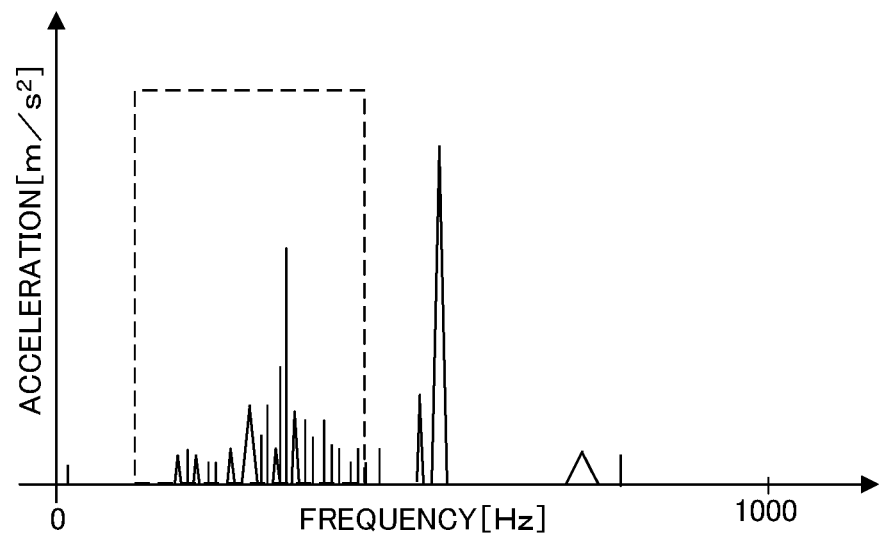
FIG. 11B is explanatory diagram illustrating the process of designating the analysis region.
Figure 12A:
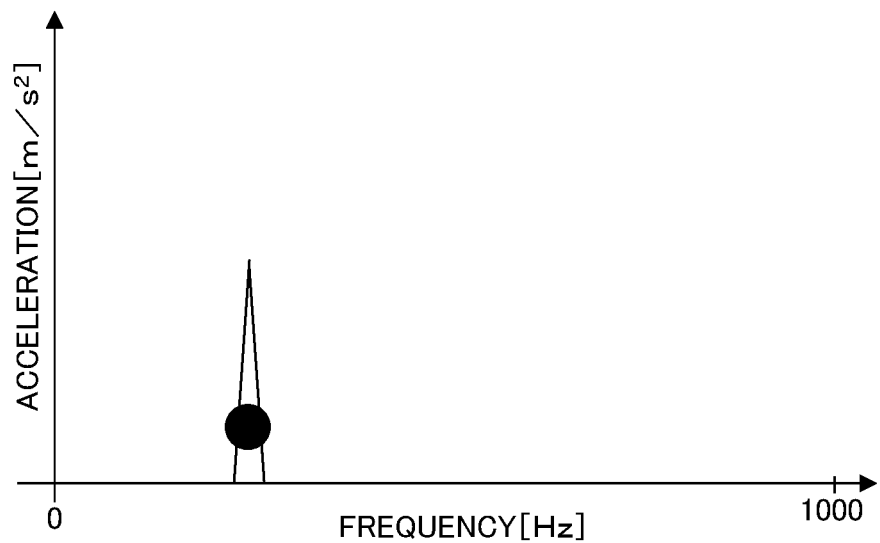
FIG. 12A is explanatory diagram illustrating a center-of-gravity calculation process.
Figure 12B:
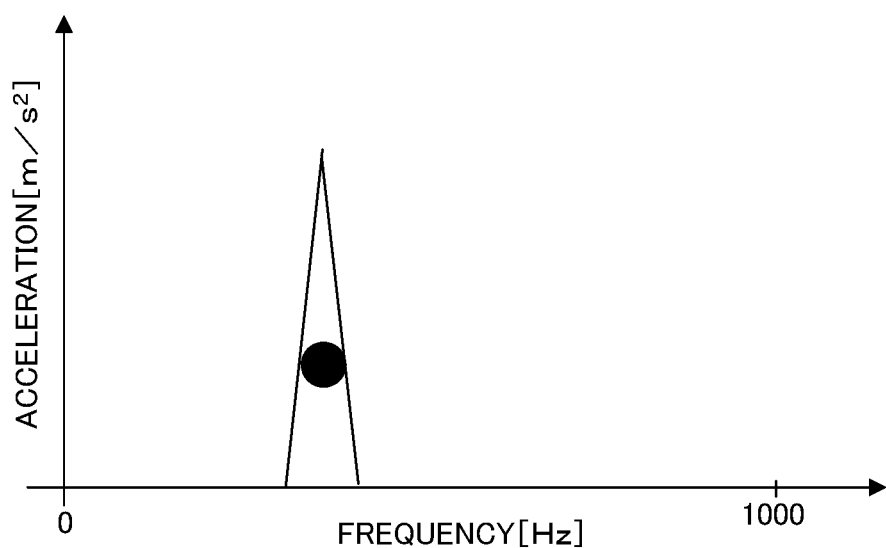
FIG. 12B is explanatory diagram illustrating the center-of-gravity calculation process.

FIG. 10 is a flowchart illustrating a processing procedure related to feature amount calculation, FIGS. 11A and 11B are explanatory diagrams illustrating a process of designating an analysis region, and FIGS. 12A and 12B are explanatory diagrams illustrating a center-of-gravity calculation process. The computation unit 71 reads frequency analysis waveform data calculated in steps S104 and S142 (step S151). Then, the computation unit 71 executes a noise canceling process (step S152). For example, vibration in a band of 50 Hz or a band of 60 Hz is removed as noise.

Next, as illustrated in FIGS. 11A and 11B, the computation unit 71 designates an analysis region from a frequency distribution of acceleration (step S153). In FIG. 11, a horizontal axis indicates frequency, a vertical axis indicates acceleration, and the frequency distribution of acceleration is displayed as a waveform. In addition, the analysis region is displayed as a broken line rectangular frame. FIG. 11A is a frequency analysis waveform related to the vibration of the normal ball screw 30, and FIG. 11B is a frequency analysis waveform related to the vibration of the abnormal ball screw 30. The analysis region is, for example, a frequency band of ±150 Hz with respect to the operation frequency. The operator may manually select the analysis region.

Next, the computation unit 71 calculates the center of gravity as illustrated in FIGS. 12A and 12B using the frequency analysis waveform data of the acceleration included in the designated analysis region (step S154). In FIGS. 12A and 12B, a horizontal axis indicates frequency, a vertical axis indicates acceleration, and a black circle indicates the center of gravity. Specifically, the computation unit 71 calculates the center of gravity in a frequency-acceleration plane as illustrated in FIGS. 12A and 12B based on a plurality of pieces of data (frequency and acceleration) included in the analysis region. FIG. 12A illustrates the center of gravity obtained from the frequency analysis waveform related to the vibration of the normal ball screw 30, and FIG. 12B illustrates the center of gravity obtained from the frequency analysis waveform related to the vibration of the abnormal ball screw 30.

The center of gravity of the frequency is represented by the following Equation (1), and the center of gravity of the acceleration is represented by the following Equation (2).

[Formula 1]

$$f_G = \frac{\Sigma(f_i \times a_i)}{S} \quad (1)$$

$$a_G = \frac{\Sigma a_i^2}{2S} \quad (2)$$

where fi: Frequency of the i-th frequency component included in the analysis region ai: Acceleration of the i-th frequency component included in the analysis region S: Sum of accelerations of all frequency components included in the analysis region Returning to FIG. 3, the abnormality detection apparatus 7 completing the process of step S105 executes a failure state determination process (step S106).

Figure 14:
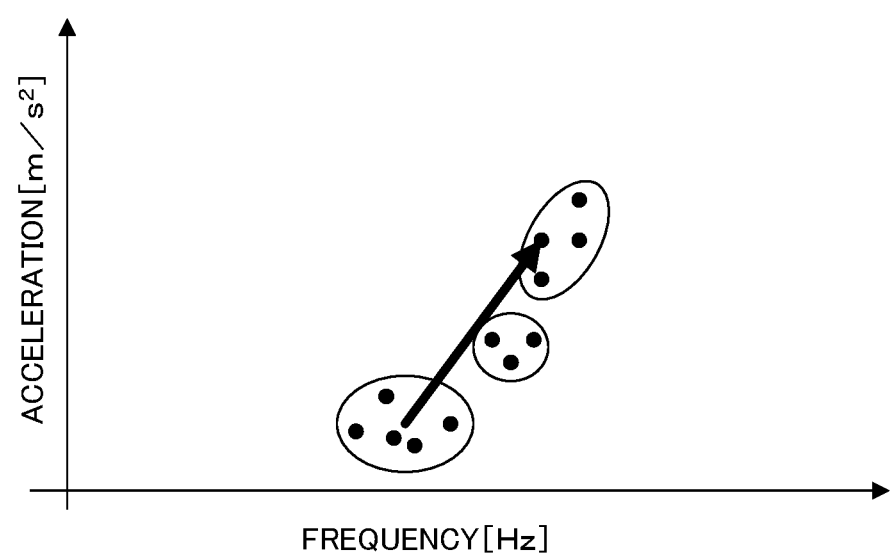
FIG. 14 is an explanatory diagram illustrating the failure state determination process.

FIG. 13 is a flowchart illustrating a processing procedure related to the failure state determination process, and FIG. 14 is an explanatory diagram illustrating the failure state determination process. The computation unit 71 reads the center of gravity calculated in step S105 or step S154 and a plurality of centers of gravity indicated by the normal vibration information 72b stored in the storage unit 72 as feature amounts (step S161). Then, as illustrated in FIG. 14, the computation unit 71 causes the display unit 7d to display the read feature amount (step S162). In FIG. 14, a horizontal axis indicates frequency, a vertical axis indicates acceleration, and a black circle indicates the feature amount read in step S161, that is, the center of gravity.

Then, the computation unit 71 calculates failure information indicating the presence or absence, or degree of failure based on the read feature amount (step S163). Specifically, the computation unit 71 calculates a statistical distance between the center of gravity calculated in step S154 and a plurality of centers of gravity at the time of normality, for example, the Mahalanobis distance. The Mahalanobis distance is an example, and it is possible to adopt another statistical distance such as the Euclidean distance.

Then, the computation unit 71 causes the display unit 7d to display an image indicating the failure information (step S164). For example, the computation unit 71 generates an arrow image having an average position of the centers of gravity at the time of normality on the frequency-acceleration plane as a start point and the center of gravity calculated in step S154 as an end point, and causes the display unit 7d to display the arrow image.

Further, when the failure information calculated in the past is stored, the computation unit 71 may cause the display unit 7d to display a history of the failure information.

Figure 15:
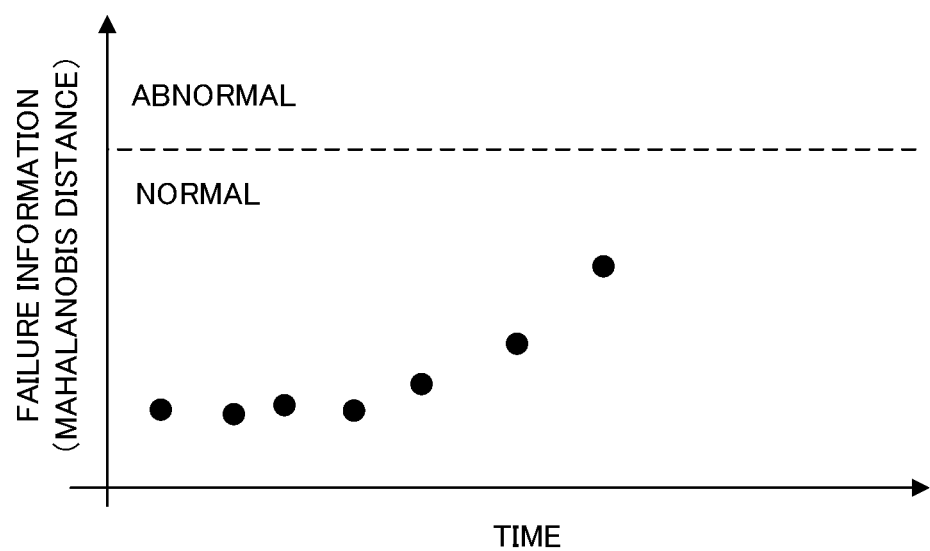
FIG. 15 is an explanatory diagram illustrating a history of failure state determination results.

FIG. 15 is an explanatory diagram illustrating a history of failure state determination results. A horizontal axis indicates time such as a date when inspection is performed, and a vertical axis indicates a failure state, for example, the Mahalanobis distance. A broken line indicates a boundary line between a normal state and an abnormal state of the ball screw 30. A plurality of black circles indicates failure states calculated in the past. The operator may detect the state of the ball screw 30 in detail by checking the history of the failure state as illustrated in FIG. 15. Specifically, the operator may recognize a degree at which the current ball screw 30 is separated from the normal state and whether the current ball screw 30 is close to the abnormal state, and assume the timing at which maintenance is required, etc.

<Abnormality Detection Based on Motor Current>

Figure 16:
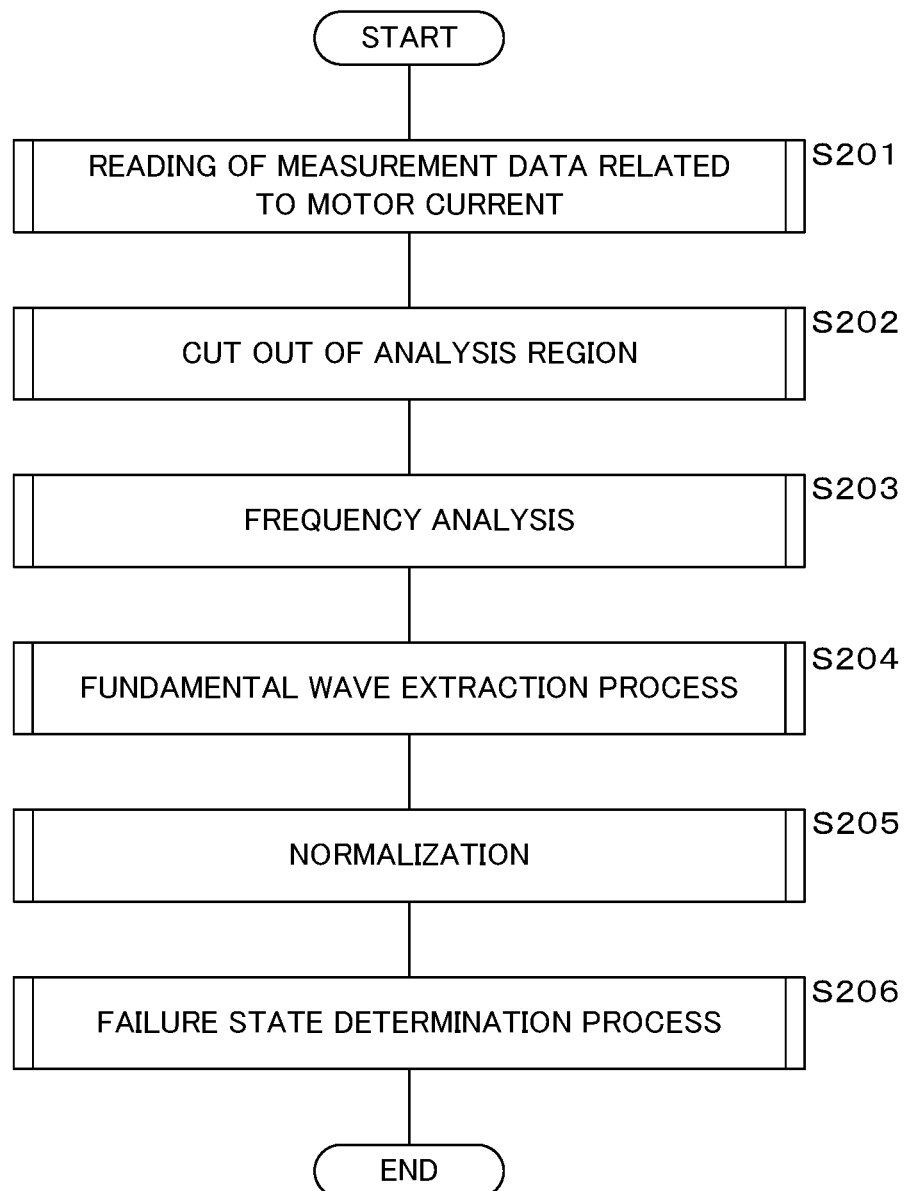
FIG. 16 is a flowchart illustrating a processing procedure of an abnormality detection method based on a motor current.

FIG. 16 is a flowchart illustrating a processing procedure of an abnormality detection method based on a motor current. The abnormality detection apparatus 7 reads measurement data related to the alternating current of the injection electric motor 29, that is, current data (step S201). Then, the abnormality detection apparatus 7 cuts out the analysis region (step S202), and performs frequency analysis on the measurement data of the analysis target (step S203). The processing contents of steps S201 to S203 are similar to those for reading, cutting out, and frequency analysis processing of measurement data related to vibration, except that the measurement data is current data.

The computation unit 71 of the abnormality detection apparatus 7 completing the process of step S203 executes the fundamental wave extraction process (step S204).

Figure 17:
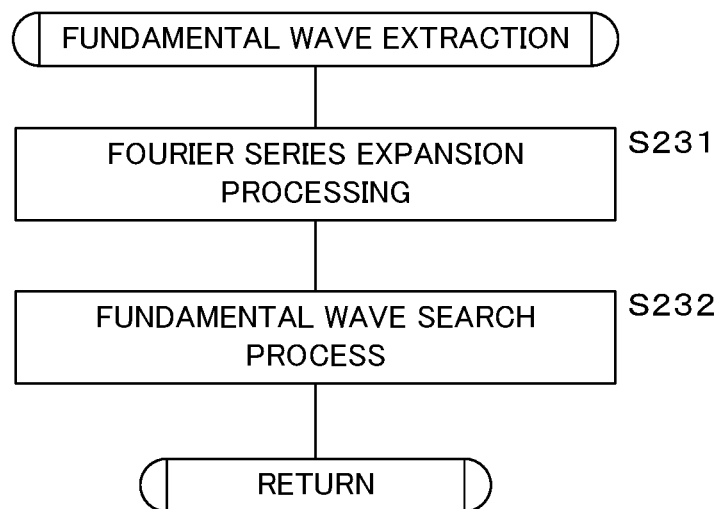
FIG. 17 is a flowchart related to a fundamental wave extraction process.

FIG. 17 is a flowchart related to the fundamental wave extraction process. The computation unit 71 expands the current measurement data into a Fourier series (step S231), and executes a fundamental wave search process (step S232). In the fundamental wave search process, the computation unit 71 specifies a frequency and amplitude value (peak value) of a fundamental wave. The fundamental wave is usually near the fundamental frequency of the alternating current of the injection electric motor 29, for example, 50 Hz or 60 Hz, and is a wave having the largest peak value. The computation unit 71 may be configured to cause the display unit 7d to display a waveform of the fundamental wave.

Returning to FIG. 16, the computation unit 71 completing the process of step S204 normalizes the frequency analysis waveform based on the frequency and amplitude value of the fundamental wave (step S205).

Figure 18:
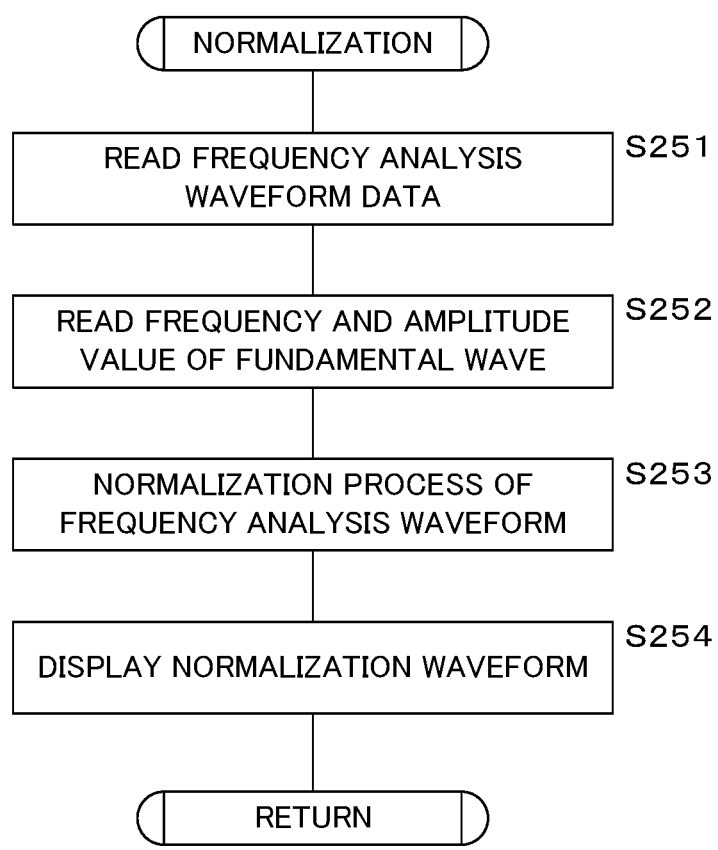
FIG. 18 is a flowchart related to a normalization process.
Figure 19:
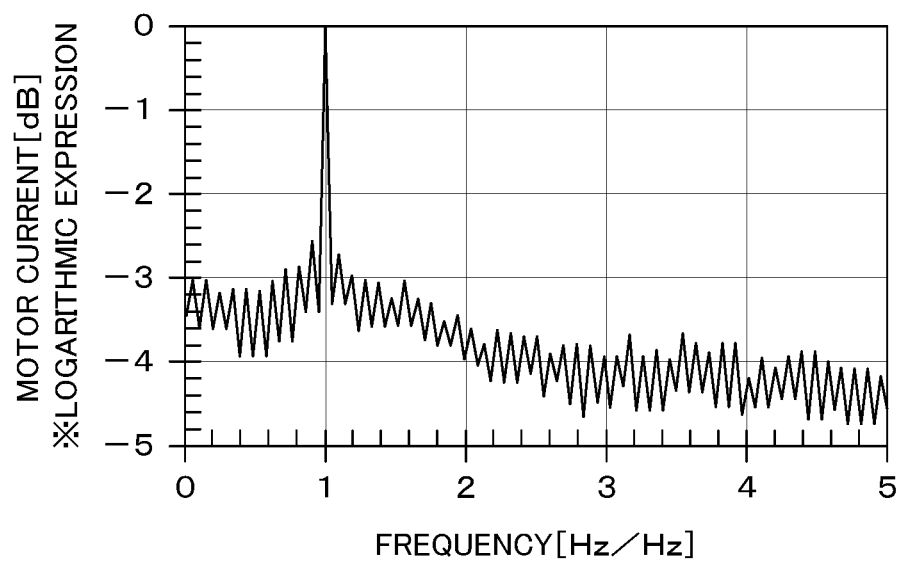
FIG. 19 is an explanatory diagram illustrating a normalized frequency analysis waveform.

FIG. 18 is a flowchart related to a normalization process, and FIG. 19 is an explanatory diagram illustrating a normalized frequency analysis waveform. The computation unit 71 reads frequency analysis waveform data (step S251) and reads a frequency and an amplitude value of the fundamental wave (step S252). Then, as illustrated in FIG. 19, the computation unit 71 normalizes the frequency analysis waveform so that, for example, the frequency of the fundamental wave is "1" and the amplitude value of the fundamental wave is "1" ("0" in logarithmic expression) (step S253). A graph illustrated in FIG. 19 is a semi-logarithmic graph in which a horizontal axis indicates frequency, a vertical axis indicates motor current, and a motor current is logarithmically displayed. It is obvious that the normalization method is an example. Next, the computation unit 71 causes the display unit 7d to display a normalization waveform (step S254).

Returning to FIG. 16, the abnormality detection apparatus 7 completing the process of step S205 executes the failure state determination process (step S206).

Figure 20:
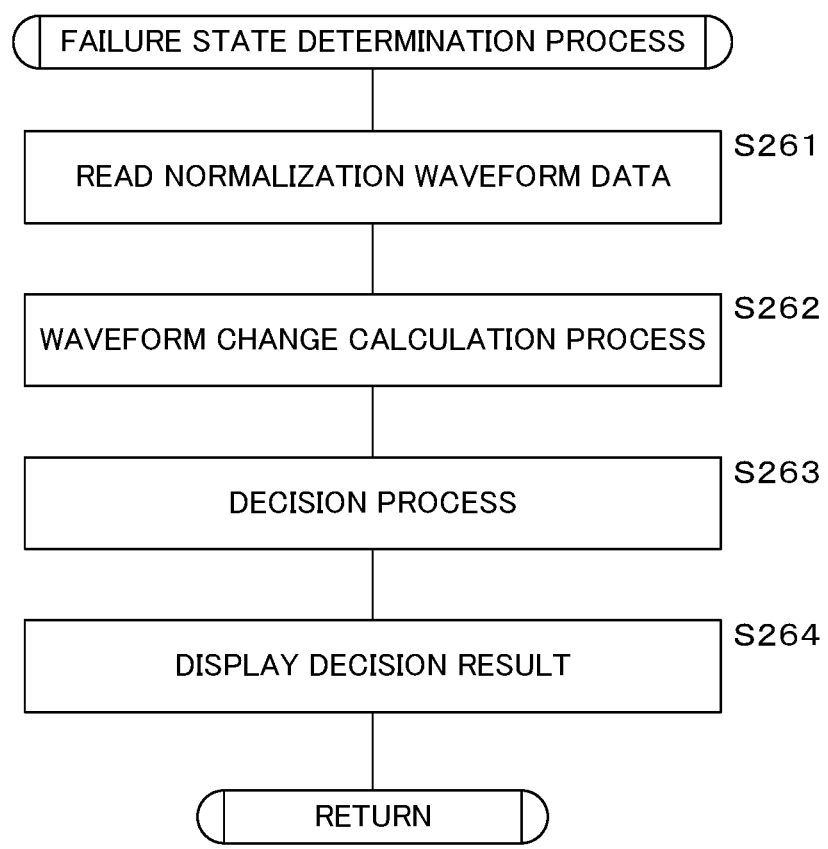
FIG. 20 is a flowchart illustrating a processing procedure related to the failure state determination process.
Figure 21A:
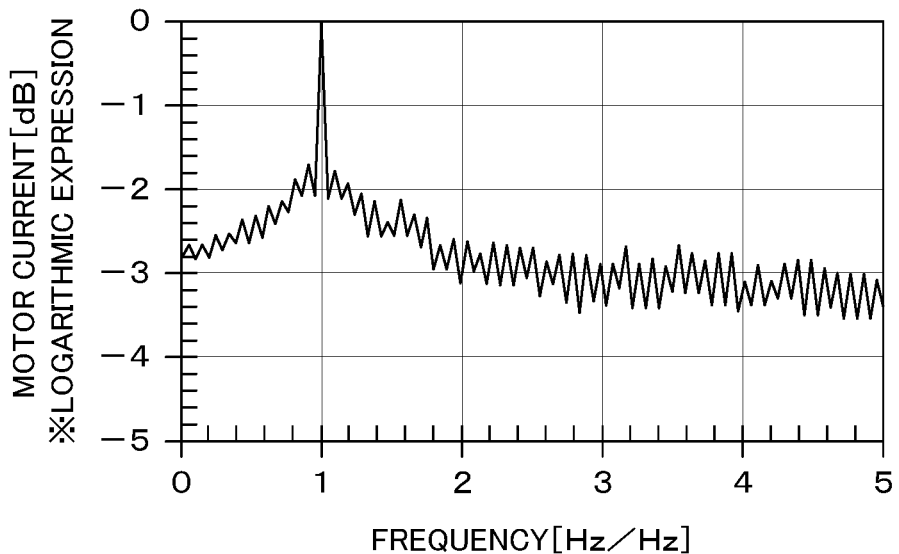
FIG. 21A is an explanatory diagram illustrating the failure state determination process.
Figure 21B:
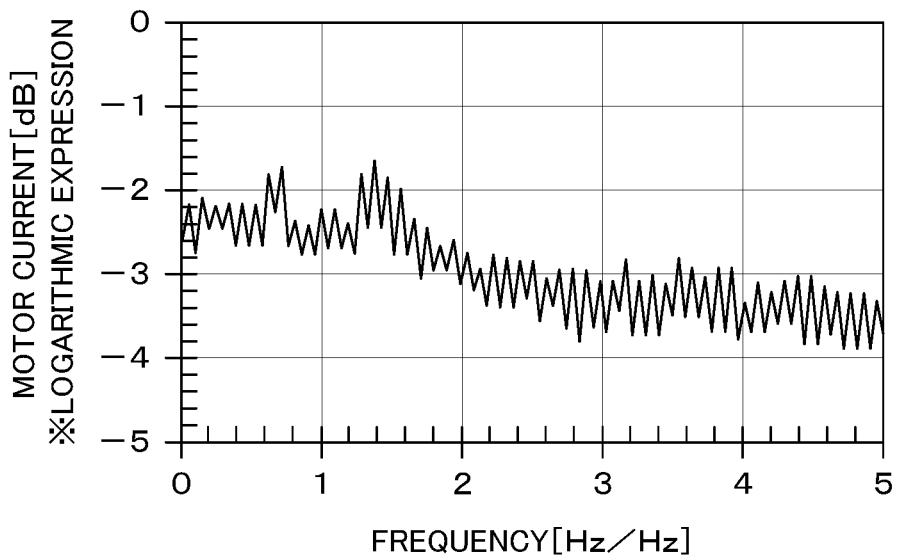
FIG. 21B is an explanatory diagram illustrating the failure state determination process.

FIG. 20 is a flowchart illustrating a processing procedure related to the failure state determination process, and FIGS. 21A and 21B are explanatory diagrams illustrating the failure state determination process.

The computation unit 71 reads normalization waveform data, that is, frequency analysis waveform data normalized in step S205 (step S261).

FIG. 21A illustrates a normalization waveform of a current when the ball screw 30 is normal, and FIG. 21B illustrates a normalization waveform of a current when the ball screw 30 is abnormal.

The computation unit 71 calculates information indicating a change in the frequency analysis waveform based on the normalization waveform data (step S262). The computation unit 71 calculates a statistic of the normalization waveform, for example, a variance, as information indicating a change in the frequency analysis waveform. Further, the computation unit 71 may create image data of the normalization waveform as information indicating the change in the frequency analysis waveform.

Next, the computation unit 71 calculates failure information indicating the presence or absence, or degree of failure of the ball screw 30 based on the information calculated in step S262 (step S263). Specifically, the computation unit 71 calculates a difference between the statistic calculated in step S262 and the statistic indicated by the normal vibration information 72b stored in the storage unit 72. The statistic is, for example, a variance.

In the case of the configuration in which the computation unit 71 creates the image data of the normalization waveform in step S262, it is preferable to determine the presence or absence of a failure of the ball screw 30 by comparing the normalization waveform and a normalization waveform at the time of normality indicated by the normal vibration information 72b. For example, the computation unit 71 determines the presence or absence of a failure of the ball screw 30 by comparing the similarity of the normalization waveform with a predetermined threshold value.

Then, the computation unit 71 causes the display unit 7d to display an image indicating failure information (step S264). For example, the computation unit 71 preferably causes the display unit 7d to display the magnitude of the difference in variation as a degree of abnormality of the ball screw 30, that is, a degree of separation at the time of normality. In addition, it is preferable to display the difference in variance at the time of abnormality.

The computation unit 71 may compare the variance with the threshold value, display that the ball screw 30 is normal when the variance is smaller than the threshold value, and display that the ball screw 30 is abnormal when the variance is larger than the threshold value. Further, by comparing the variance using a plurality of threshold values, it is possible to display each state of the ball screw 30 from the normal state to the failure state, that is, a state in which the ball screw 30 may reach the abnormal state.

The computation unit 71 may be configured to cause the display unit 7d to display the frequency analysis waveform at the time of normality and the frequency analysis waveform at the time of abnormality by superimposing the frequency analysis waveforms or arranging the frequency analysis waveforms side by side.

According to the abnormality detection apparatus 7, the abnormality detection method, and the computer program 72a according to the first embodiment configured as described above, the abnormality of the ball screw 30 may be detected by frequency analysis of the vibration intensity and the motor current generated in the ball screw 30.

Further, by providing the vibration sensor 7a on a side portion of the nut 32 to detect the acceleration of the screw shaft 31 in the axial direction, when compared to the case where the vibration sensor 7a is provided in another portion and posture, it is possible to detect the abnormality of the ball screw 30 with higher accuracy.

Further, by comparing the center of gravity of the frequency distribution of the acceleration with the center of gravity at the time of normality, when compared to the case of simply monitoring the vibration intensity, it is possible to detect the abnormality of the ball screw 30 with higher accuracy.

Furthermore, by comparing the center of gravity calculated using a predetermined frequency band based on the characteristics of the injection electric motor 29 or the injection transmission mechanism 20 as the analysis target with the center of gravity at the time of normality, when compared to the case of analyzing another frequency band, it is possible to detect the abnormality of the ball screw 30 with higher accuracy.

Furthermore, the computation unit 71 may acquire characteristic information of the injection electric motor 29 or the injection transmission mechanism 20, compute a frequency band which is an analysis target, and determine a failure state. The operator does not need to determine a frequency range which is an analysis target, and the computation unit 71 may automatically or semi-automatically calculate the presence or absence of an abnormality of the ball screw 30.

Furthermore, the abnormality of the ball screw 30 may be detected by a simple process of comparing the statistic of the frequency analysis waveform obtained by the frequency analysis of the motor current, for example, the variance.

Furthermore, by comparing the image of the frequency analysis waveform of the current with the frequency analysis waveform at the time of normality, it is possible to detect the abnormality of the ball screw 30 in consideration of information not included in the variance.

Furthermore, by normalizing and comparing the frequency analysis waveforms of the current, frequency analysis waveforms of injection molding machines having different models or manufacturing times may be compared with each other, and it is possible to more accurately determine the presence or absence of an abnormality of the ball screw 30 by using more frequency analysis waveforms.

In the first embodiment, a description has been given of an example of individually executing the abnormality detection of the ball screw 30 based on the vibration and the abnormality detection of the ball screw 30 based on the motor current. However, the presence or absence of the abnormality of the ball screw 30 may be determined by the logical OR or the logical AND using both the abnormality detection result based on the vibration of the ball screw and the abnormality detection result based on the motor current. Further, the abnormality detection apparatus 7 may be configured to calculate the average degree of dissociation from the time of normality indicated by each abnormality detection result and output the failure state of the ball screw 30.

When the abnormality of the ball screw 30 is detected by using the vibration intensity of the acceleration data, etc. and the alternating current of the injection electric motor 29, the computation unit 71 is preferably configured to synchronize and acquire the vibration intensity data output by the vibration sensor 7a and the current data output by the current sensor 7b.

Further, technical elements indicated by abnormality detection based on vibration may be applied to abnormality detection based on motor current. Similarly, technical elements indicated by abnormality detection based on motor current may be applied to abnormality detection based on vibration.

In the first embodiment, an example of detecting an abnormality of the injection ball screw 30 has mainly been described. However, the abnormality detection apparatus 7 according to the first embodiment may be used to detect a ball screw (not illustrated) included in the drive mechanism of the mold clamping apparatus 50 and another ball screw included in the drive mechanism of the injection molding machine.

Further, in the first embodiment, an example in which the vibration sensor 7a is provided on the side surface of the nut 32 has been described. However, the vibration sensor 7a may be provided on the peripheral surface of the nut 32. Further, the vibration sensor 7a may be provided inside the nut 32.

Further, in the first embodiment, an example in which the screw shaft 31 is driven and the nut 32 is linearly moved has been described. However, the nut 32 may be rotated to linearly move the screw shaft 31. In this case, the vibration sensor 7a may be provided at an appropriate position on the screw shaft 31, for example, at the end.

Furthermore, in the first embodiment, the pulley and the timing belt are given as an example of the injection transmission mechanism 20. However, the transmission mechanism for the driving force is not limited thereto, and it is possible to use a gear mechanism, a chain mechanism, a friction transmission mechanism, and other known transmission mechanisms.

Further, in the first embodiment, an example of inspecting the abnormality of the ball screw 30 during maintenance and inspection operation has mainly been described. However, as described above, it is possible to adopt a configuration in which the abnormality of the ball screw 30 is monitored in real time.

Furthermore, even though a rotary electric motor has been given as an example of a drive source of the ball screw 30, a power source is not limited to the electric motor, and other known drive sources may be used.

Second Embodiment

An abnormality detection apparatus, an abnormality detection method, and a computer program according to a second embodiment are different from those of the first embodiment in a failure determination method, and thus the difference will be mainly described below. Since other configurations, actions, and effects are similar to those in the first embodiment, the corresponding parts are designated by the same reference symbols and detailed description thereof will be omitted.

Figure 22:
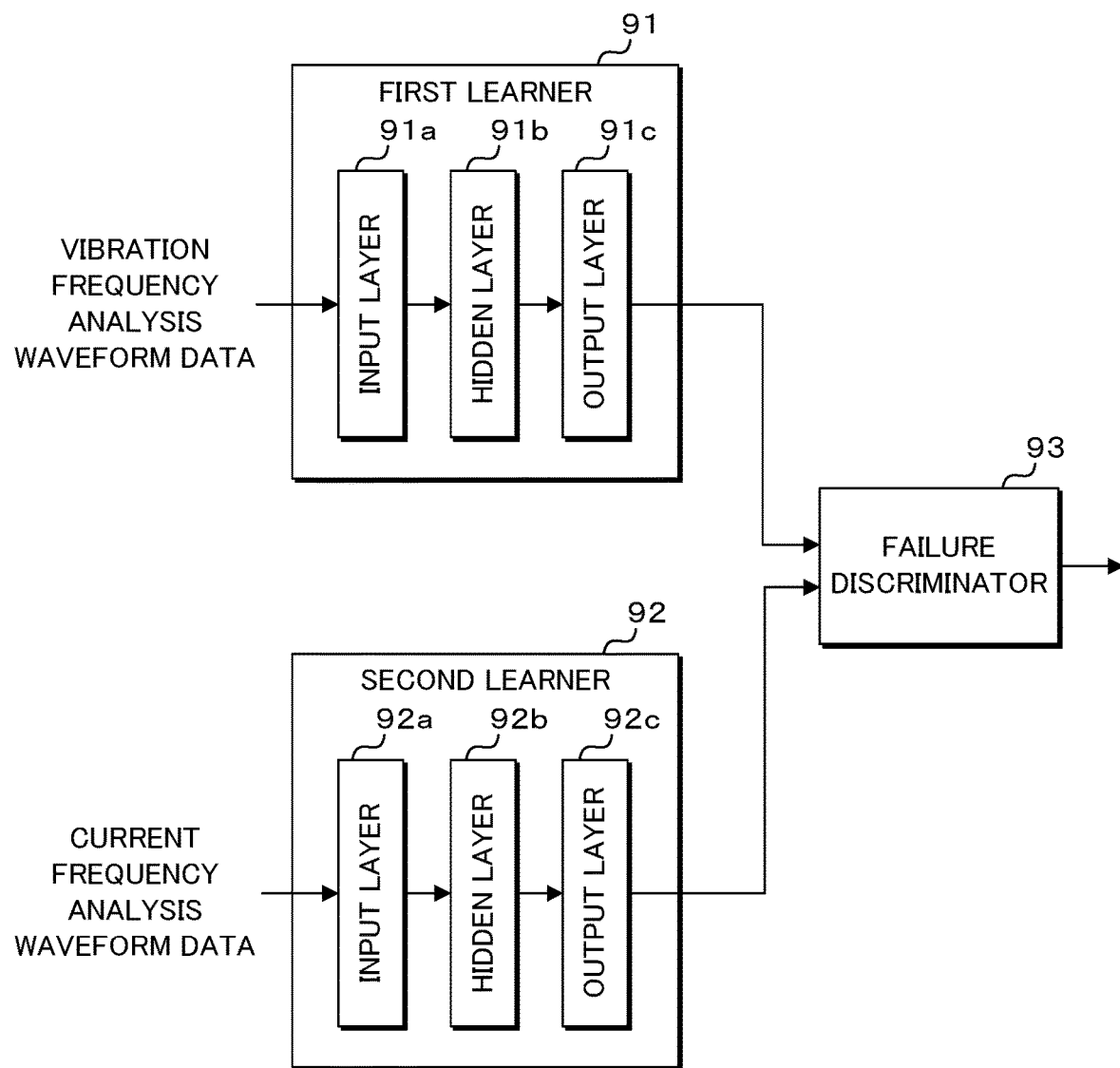
FIG. 22 is a functional block diagram of a computation unit according to a second embodiment.

FIG. 22 is a functional block diagram of a computation unit 71 according to the second embodiment. The computation unit 71 according to the second embodiment includes a first learner 91, a second learner 92, and a failure discriminator 93 as functional units.

For example, the first learner 91 is a neural network including an input layer 91a to which frequency analysis waveform data related to the vibration of the ball screw 30 is input, a hidden layer 91b that performs computation based on a learned weighting factor on the frequency analysis waveform data input to the input layer 91a, and an output layer 91c that outputs data indicating a degree of abnormality of the ball screw 30. In other words, the first learner 91 is a trained model that causes the computer to function so as to output data indicating the degree of abnormality of the ball screw 30 when data of vibration frequency analysis waveform is input.

Learning of the first learner 91 may be generated by preparing training data including a plurality of frequency analysis waveform data related to vibrations and teacher data indicating a degree of abnormality of the ball screw 30 outputting the frequency analysis waveform data, and optimizing a weighting factor of the hidden layer 91b of the neural network by using error back propagation method, error gradient descent method, etc. so that, when the frequency analysis waveform data of the training data is input, data indicating the degree of abnormality of the ball screw 30 indicated by teacher information is output.

The input layer 91a includes a plurality of neurons (nodes). The data of the vibration frequency analysis waveform is, for example, a plurality of pieces of data (frequency and acceleration), and a frequency and acceleration of each piece of data are input to the plurality of neurons (nodes) included in the input layer 91a.

The data of the vibration frequency analysis waveform may be image data representing the waveform or time series data. When the frequency analysis waveform data is image data, the first learner 91 may include a convolutional neural network (CNN). The CNN has a plurality of sets of convolutional layers, pooling layers, and fully connected layers (not illustrated) as the hidden layer 91b. When the data of the vibration frequency analysis waveform is time series data, it is preferable to use a recurrent neural network (RNN).

The output layer 91c has one or a plurality of neurons, and data output from each neuron is input to the failure discriminator 93. Each neuron has, for example, a neuron (node) indicating a probability value indicating that the ball screw 30 is normal, and a neuron (node) indicating a probability indicating that the ball screw is abnormal.

For example, the second learner 92 is a neural network including an input layer 92a to which frequency analysis waveform data related to the motor current or normalization waveform data obtained by normalizing the data is input, a hidden layer 92b that performs computation based on a learned weighting factor on the frequency analysis waveform data or the normalization waveform data input to the input layer 92a, and an output layer 92c that outputs data indicating a degree of abnormality of the ball screw 30. In other words, the second learner 92 is a trained model that causes the computer to function so as to output data indicating the presence or absence of abnormality of the ball screw 30 when data of a current frequency or normalization waveform data is input.

Learning of the second learner 92 may be generated by preparing training data including a plurality of frequency analysis waveform data or normalization waveform data related to motor currents and teacher data indicating a degree of abnormality of the ball screw 30 outputting the frequency analysis waveform data or the normalization waveform data, and optimizing a weighting factor of the hidden layer 92b of the neural network by using error back propagation method, error gradient descent method, etc. so that, when the frequency analysis waveform data or the normalization waveform data of the training data is input, data indicating the degree of abnormality of the ball screw 30 indicated by teacher information is output.

The input layer 92a includes a plurality of neurons (nodes). The data of the current frequency or the normalization waveform data is, for example, a plurality of pieces of data (frequency and current), and a frequency and acceleration of each piece of data are input to the plurality of neurons (nodes) included in the input layer 92a.

The frequency analysis waveform data of the motor current or the normalization waveform data input to the input layer 92a may be image data representing the waveform or time series data. When the frequency analysis waveform data or the normalization waveform data is image data, the second learner 92 may include a CNN. The CNN has a plurality of sets of convolutional layers, pooling layers, and fully connected layers (not illustrated) as the hidden layer 92b. When the data of the current frequency is time series data, it is preferable to use an RNN.

The output layer 92c has one or a plurality of neurons, and data output from each neuron is input to the failure discriminator 93. Each neuron has, for example, a neuron (node) indicating a probability value indicating that the ball screw 30 is normal, and a neuron (node) indicating a probability indicating that the ball screw is abnormal.

The failure discriminator 93 acquires data output from the first learner 91 and the second learner 92, and comprehensively determines the presence or absence of a failure or the degree of failure of the ball screw 30 based on the acquired data. For example, the failure discriminator 93 preferably calculates an average value of probabilities indicating that the ball screw 30 is normal and an average value of probabilities indicating that the ball screw 30 is abnormal, which are output from the first learner 91 and the second learner 92.

The failure discriminator 93 may include a neural network, and the neural network may determine the presence or absence of a failure of the ball screw 30. In this case, the data output from the first learner 91 and the second learner 92 does not have to be data indicating the presence or absence of the abnormality of the ball screw 30, and may be data indicating the characteristics of the frequency analysis waveform of the vibration and the frequency analysis waveform or normalization waveform of the current.

According to the abnormality detection apparatus 7, the abnormality detection method, and the computer program 72a according to the second embodiment, it is possible to machine-learn the frequency analysis waveforms of the vibration at the time of normality and at the time of abnormality, and determine the failure state of the ball screw 30.

Further, it is possible to machine-learn the frequency analysis waveforms of the current at the time of normality and at the time of abnormality, and determine the failure state of the ball screw 30.

Further, the failure state of the ball screw 30 may be comprehensively determined by using both the frequency analysis waveform data of the vibration and the frequency analysis waveform data of the current at the time of normality and at the time of abnormality.

In the second embodiment, an example of machine learning using a neural network such as CNN or RNN has mainly been described. However, the configuration of the trained model is not limited to CNN. RNN, etc., and may be a neural network other than CNN or RNN, such as SVM (Support Vector Machine), a Basian network, a recurrent tree, etc.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. An abnormality detection apparatus for detecting an abnormality of a ball screw provided in an injection molding machine, the abnormality detection apparatus comprising:
    a vibration sensor configured to detect vibration of the ball screw; and
    an arithmetic circuit configured to detect an abnormality of the ball screw based on information related to a distribution of frequency components obtained by frequency analysis of a vibration intensity detected by the vibration sensor, and information related to a distribution of frequency components obtained by frequency analysis of a vibration intensity detected when the ball screw is normal;
    wherein
    information related to a distribution of frequency components obtained by frequency analysis of a vibration intensity is a center of gravity of the distribution of the frequency components, and
    the arithmetic circuit calculates a statistical distance between a center of gravity of a distribution of frequency components obtained by frequency analysis of a vibration intensity detected by the vibration sensor and a center of gravity of a distribution of frequency components obtained by frequency analysis of a vibration intensity detected when the ball screw is normal, and detects an abnormality of the ball screw based on a calculated statistical distance.

2. The abnormality detection apparatus according to claim 1, wherein the ball screw includes:
    a screw shaft configured to rotate with a motor to drive the ball screw; and
    a nut configured to linearly move along the screw shaft in response to rotation of the screw shaft, and
    the vibration sensor is provided on the nut.

3. The abnormality detection apparatus according to claim 2, wherein
    the nut has a cylindrical shape, and
    the vibration sensor is provided on an end face of the nut to detect at least a vibration intensity of the nut in a linear movement direction.

4. An abnormality detection method of detecting an abnormality of a ball screw provided in an injection molding machine, the abnormality detection method comprising:
    detecting vibration of the ball screw;
    performing frequency analysis on a detected vibration intensity; and
    detecting an abnormality of the ball screw based on information related to a distribution of frequency components obtained by frequency analysis, and information related to a distribution of frequency components obtained by frequency analysis of a vibration intensity detected when the ball screw is normal;
    wherein
    information related to a distribution of frequency components obtained by frequency analysis of a vibration intensity is a center of gravity of the distribution of the frequency components, and
    an arithmetic circuit calculates a statistical distance between a center of gravity of a distribution of frequency components obtained by frequency analysis of a vibration intensity detected by the vibration sensor and a center of gravity of a distribution of frequency components obtained by frequency analysis of a vibration intensity detected when the ball screw is normal, and detects an abnormality of the ball screw based on a calculated statistical distance.

5. A non-transitory computer readable recording medium storing a computer program for causing a computer to execute a process of detecting an abnormality of a ball screw provided in an injection molding machine, the computer program causing the computer to execute processes of:
    detecting vibration of the ball screw;
    performing frequency analysis on a detected vibration intensity; and
    detecting an abnormality of the ball screw based on information related to a distribution of frequency components obtained by frequency analysis, and information related to a distribution of frequency components obtained by frequency analysis of a vibration intensity detected when the ball screw is normal;
    wherein
    information related to a distribution of frequency components obtained by frequency analysis of a vibration intensity is a center of gravity of the distribution of the frequency components, and
    an arithmetic circuit calculates a statistical distance between a center of gravity of a distribution of frequency components obtained by frequency analysis of a vibration intensity detected by the vibration sensor and a center of gravity of a distribution of frequency components obtained by frequency analysis of a vibration intensity detected when the ball screw is normal, and detects an abnormality of the ball screw based on a calculated statistical distance.

6. An abnormality detection apparatus for detecting an abnormality of a ball screw provided in an injection molding machine, the abnormality detection apparatus comprising:
  a vibration sensor configured to detect vibration of the ball screw; and
  an arithmetic circuit configured to detect an abnormality of the ball screw based on information related to a distribution of frequency components obtained by frequency analysis of a vibration intensity detected by the vibration sensor, and information related to a distribution of frequency components obtained by frequency analysis of a vibration intensity detected when the ball screw is normal;
  wherein the arithmetic circuit selects a predetermined frequency range based on a characteristic of a motor configured to drive the ball screw, or a characteristic of a transmission mechanism configured to transmit a driving force from the motor to the ball screw, and detects an abnormality of the ball screw based on information related to a distribution of frequency components in a selected predetermined frequency range.

7. The abnormality detection apparatus according to claim 6, further comprising an input interface configured to acquire information indicating a characteristic of the motor or a characteristic of the transmission mechanism,
  wherein the arithmetic circuit determines the predetermined frequency range based on information acquired by the input interface.

8. An abnormality detection method of detecting an abnormality of a ball screw provided in an injection molding machine, the abnormality detection method comprising:
  detecting vibration of the ball screw;
  performing frequency analysis on a detected vibration intensity; and
  detecting an abnormality of the ball screw based on information related to a distribution of frequency components obtained by frequency analysis, and information related to a distribution of frequency components obtained by frequency analysis of a vibration intensity detected when the ball screw is normal;
  wherein an arithmetic circuit selects a predetermined frequency range based on a characteristic of a motor configured to drive the ball screw, or a characteristic of a transmission mechanism configured to transmit a driving force from the motor to the ball screw, and detects an abnormality of the ball screw based on information related to a distribution of frequency components in a selected predetermined frequency range.

9. A non-transitory computer readable recording medium storing a computer program for causing a computer to execute a process of detecting an abnormality of a ball screw provided in an injection molding machine, the computer program causing the computer to execute processes of:
  detecting vibration of the ball screw;
  performing frequency analysis on a detected vibration intensity; and
  detecting an abnormality of the ball screw based on information related to a distribution of frequency components obtained by frequency analysis, and information related to a distribution of frequency components obtained by frequency analysis of a vibration intensity detected when the ball screw is normal;
  wherein an arithmetic circuit selects a predetermined frequency range based on a characteristic of a motor configured to drive the ball screw, or a characteristic of a transmission mechanism configured to transmit a driving force from the motor to the ball screw, and detects an abnormality of the ball screw based on information related to a distribution of frequency components in a selected predetermined frequency range.

10. An abnormality detection apparatus for detecting an abnormality of a ball screw provided in an injection molding machine, the abnormality detection apparatus comprising:
  a vibration sensor configured to detect vibration of the ball screw; and
  an arithmetic circuit configured to detect an abnormality of the ball screw based on information related to a distribution of frequency components obtained by frequency analysis of a vibration intensity detected by the vibration sensor, and information related to a distribution of frequency components obtained by frequency analysis of a vibration intensity detected when the ball screw is normal;
  wherein the arithmetic circuit includes a learner machine-trained to output information related to presence or absence of an abnormality of the ball screw when information obtained by frequency analysis of a vibration intensity detected by the vibration sensor is input.

11. An abnormality detection method of detecting an abnormality of a ball screw provided in an injection molding machine, the abnormality detection method comprising:
  detecting vibration of the ball screw;
  performing frequency analysis on a detected vibration intensity; and
  detecting an abnormality of the ball screw based on information related to a distribution of frequency components obtained by frequency analysis, and information related to a distribution of frequency components obtained by frequency analysis of a vibration intensity detected when the ball screw is normal;
  wherein an arithmetic circuit includes a learner machine-trained to output information related to presence or absence of an abnormality of the ball screw when information obtained by frequency analysis of a vibration intensity detected by the vibration sensor is input.

12. A non-transitory computer readable recording medium storing a computer program for causing a computer to execute a process of detecting an abnormality of a ball screw provided in an injection molding machine, the computer program causing the computer to execute processes of:
  detecting vibration of the ball screw;
  performing frequency analysis on a detected vibration intensity; and
  detecting an abnormality of the ball screw based on information related to a distribution of frequency components obtained by frequency analysis, and information related to a distribution of frequency components obtained by frequency analysis of a vibration intensity detected when the ball screw is normal;
  wherein an arithmetic circuit includes a learner machine-trained to output information related to presence or absence of an abnormality of the ball screw when information obtained by frequency analysis of a vibration intensity detected by the vibration sensor is input.

* * * * *